US011175562B2

(12) United States Patent
Skirlo et al.

(10) Patent No.: US 11,175,562 B2
(45) Date of Patent: Nov. 16, 2021

(54) METHODS AND SYSTEMS FOR OPTICAL BEAM STEERING

(71) Applicant: Massachusetts Institute of Technology, Cambridge, MA (US)

(72) Inventors: Scott A. Skirlo, Boston, MA (US); Cheryl Marie Sorace-Agaskar, Bedford, MA (US); Marin Soljacic, Belmont, MA (US); Simon Verghese, Arlington, MA (US); Jeffrey S. Herd, Rowley, MA (US); Paul William Juodawlkis, Arlington, MA (US); Yi Yang, Cambridge, MA (US); Dirk Englund, Brookline, MA (US); Mihika Prabhu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/842,048

(22) Filed: Apr. 7, 2020

(65) Prior Publication Data
US 2020/0333683 A1 Oct. 22, 2020

Related U.S. Application Data

(63) Continuation of application No. 16/284,161, filed on Feb. 25, 2019, now Pat. No. 10,649,306, which is a (Continued)

(51) Int. Cl.
*G02F 1/295* (2006.01)
*G02F 1/313* (2006.01)
(Continued)

(52) U.S. Cl.
CPC .......... *G02F 1/3136* (2013.01); *G01S 7/4813* (2013.01); *G01S 7/4814* (2013.01);
(Continued)

(58) Field of Classification Search
CPC ...... G02F 1/3136; G02F 1/2955; G02F 1/311; G02F 2201/02; G02F 2201/06;
(Continued)

(56) References Cited

U.S. PATENT DOCUMENTS 3,108,278 A 10/1963 Walter
3,255,454 A 6/1966 Walter et al.
(Continued)

FOREIGN PATENT DOCUMENTS

GB 2524761 B 9/2018
KR 100289052 B1 5/2001
(Continued)

OTHER PUBLICATIONS

Abiri, Behrooz, Firooz Aflatouni, Angad Rekhi, and Ali Hajimiri, "Electronic Two-Dimensional Beam Steering for Integrated Optical Phased Arrays," Optical Society of America, http://authors.library.caltech.edu/60779/1/06886570.pdf, 2014, 3 pages.
(Continued)

*Primary Examiner* — Ellen E Kim
(74) *Attorney, Agent, or Firm* — Smith Baluch LLP

(57) ABSTRACT

An integrated optical beam steering device includes a planar dielectric lens that collimates beams from different inputs in different directions within the lens plane. It also includes an output coupler, such as a grating or photonic crystal, that guides the collimated beams in different directions out of the lens plane. A switch matrix controls which input port is illuminated and hence the in-plane propagation direction of the collimated beam. And a tunable light source changes the wavelength to control the angle at which the collimated beam leaves the plane of the substrate. The device is very efficient, in part because the input port (and thus in-plane propagation direction) can be changed by actuating only $\log_2 N$ of the N switches in the switch matrix. It can also be
(Continued)

much simpler, smaller, and cheaper because it needs fewer control lines than a conventional optical phased array with the same resolution.

26 Claims, 15 Drawing Sheets

Related U.S. Application Data continuation of application No. 15/630,235, filed on Jun. 22, 2017, now Pat. No. 10,261,389.

(60) Provisional application No. 62/353,136, filed on Jun. 22, 2016.

(51) Int. Cl.
 *G01S 7/481* (2006.01)
 *G02F 1/31* (2006.01)

(52) U.S. Cl.
 CPC .......... *G01S 7/4817* (2013.01); *G02F 1/2955* (2013.01); *G02F 1/311* (2021.01); *G02F 2201/02* (2013.01); *G02F 2201/06* (2013.01); *G02F 2201/302* (2013.01); *G02F 2203/70* (2013.01)

(58) Field of Classification Search
 CPC .......... G02F 2201/302; G02F 2203/70; G01S 7/4813; G01S 7/4817; G01S 7/4814
 See application file for complete search history.

(56) References Cited

U.S. PATENT DOCUMENTS

| | | | |
|---|---|---|---|
| 3,386,099 A | 5/1968 | Walter et al. | |
| 3,392,394 A | 7/1968 | Caballero | |
| 3,754,270 A | 8/1973 | Thies | |
| 4,273,445 A | 6/1981 | Thompson et al. | |
| 4,279,464 A | 7/1981 | Colombini | |
| 4,287,519 A | 9/1981 | Doi | |
| 4,468,084 A * | 8/1984 | Hutcheson | G06E 3/005 |
| | | | 359/558 |
| 4,523,803 A | 6/1985 | Arao et al. | |
| 4,531,129 A | 7/1985 | Bonebright et al. | |
| 4,737,946 A | 4/1988 | Yamashita et al. | |
| 5,044,718 A | 9/1991 | Kando | |
| 5,047,776 A | 9/1991 | Baller | |
| 5,064,263 A | 11/1991 | Stein | |
| 5,175,642 A | 12/1992 | Funato | |
| 5,247,392 A | 9/1993 | Plies | |
| 5,274,389 A | 12/1993 | Archer et al. | |
| 5,481,516 A | 1/1996 | Kim | |
| 5,621,715 A | 4/1997 | Ohyama | |
| 5,799,118 A * | 8/1998 | Ogusu | G02B 6/12007 |
| | | | 385/14 |
| 5,835,458 A | 11/1998 | Bischel et al. | |
| 5,999,284 A * | 12/1999 | Roberts | G02F 3/00 |
| | | | 250/227.27 |
| 6,031,501 A | 2/2000 | Rausch et al. | |
| 6,111,674 A | 8/2000 | Bhagavatula | |
| 6,137,933 A | 10/2000 | Hunter et al. | |
| 6,160,520 A | 12/2000 | Muhlhauser et al. | |
| 6,271,970 B1 | 8/2001 | Wade | |
| 6,304,692 B1 * | 10/2001 | Sappey | G02B 6/2938 |
| | | | 385/24 |
| 6,553,162 B1 | 4/2003 | Okayama | |
| 6,563,977 B1 | 5/2003 | Chen et al. | |
| 7,173,767 B2 * | 2/2007 | Satzke | B82Y 20/00 |
| | | | 359/652 |
| 7,184,386 B2 | 2/2007 | Nikolai et al. | |
| 7,355,162 B2 | 4/2008 | Sidorin | |
| 7,724,197 B1 | 5/2010 | Hardie et al. | |
| 7,751,658 B2 | 7/2010 | Welch et al. | |
| 8,064,744 B2 | 11/2011 | Atkins et al. | |
| 8,526,110 B1 | 9/2013 | Honea et al. | |
| 8,594,503 B2 | 11/2013 | Roelkens et al. | |
| 9,952,383 B2 * | 4/2018 | Engheta | G02B 6/1226 |
| 10,261,389 B2 | 4/2019 | Skirlo et al. | |
| 10,345,519 B1 * | 7/2019 | Miller | G02B 6/1223 |
| 10,649,306 B2 | 5/2020 | Skirlo et al. | |
| 2002/0085594 A1 | 7/2002 | Pezeshki et al. | |
| 2003/0002788 A1 | 1/2003 | Bhagavatula | |
| 2003/0043451 A1 | 3/2003 | Kato et al. | |
| 2004/0061948 A1 * | 4/2004 | Strickland | H01Q 15/08 |
| | | | 359/664 |
| 2004/0200650 A1 | 10/2004 | Polak | |
| 2005/0018951 A1 | 1/2005 | Mossberg et al. | |
| 2005/0117195 A1 | 6/2005 | Glebov et al. | |
| 2006/0227317 A1 | 10/2006 | Henderson et al. | |
| 2006/0291038 A1 * | 12/2006 | Matsumoto | G02F 2/004 |
| | | | 359/344 |
| 2007/0223552 A1 | 9/2007 | Muendel et al. | |
| 2011/0116170 A1 * | 5/2011 | Smith | G02B 3/0087 |
| | | | 359/652 |
| 2012/0327516 A1 | 12/2012 | Abbaspour-Tamijani | |
| 2013/0108215 A1 | 5/2013 | Ticknor et al. | |
| 2013/0236193 A1 | 9/2013 | Sengupta | |
| 2014/0126905 A1 * | 5/2014 | Yonenaga | H04J 14/0224 |
| | | | 398/48 |
| 2015/0219308 A1 | 8/2015 | Dross et al. | |
| 2016/0334451 A1 * | 11/2016 | Mae | G01R 29/0878 |
| 2017/0062948 A1 | 3/2017 | Artemenko et al. | |
| 2017/0371227 A1 | 12/2017 | Skirlo et al. | |
| 2019/0265574 A1 | 8/2019 | Skirlo et al. | |
| 2020/0348466 A1 * | 11/2020 | Lopez | G01S 7/4818 |

FOREIGN PATENT DOCUMENTS

| | | |
|---|---|---|
| WO | 2017223299 A1 | 12/2017 |
| WO | 2018035148 A1 | 2/2018 |

OTHER PUBLICATIONS

Ashrafi-Nia, B., Yousefi, L., and Shahabadi, M., "Integrated Optical-Phased Array Nanoantenna System Using a Plasmonic Rotman Lens," Journal of Lightwave Technology, vol. 34, No. 9, May 2016, pp. 2118-2126.

Ashrafi-Nia, B., Yousefi, L., and Shahabadi, M., "Optical Beam-Steering Using a Hybrid Plasmonic Rotman Lens," 2014 Third Conference on Millimeter-Wave and Terahertz Technologies (MMWATT), Dec. 2014-Jan. 2015, 4 pages.

Borghesani, Anna, Neil Fensom, Andrew Scott, Gavin Crow, Lillianne M. Johnston, James A. King, Lesley J. Rivers, S. Cole, S. Perrin, D. Scrase, G. Bonfrate, A. Ellis, I. Lealman, "High Saturation Power (> 16.5 dBm) and Low Noise Figure ( < 6dB) Semiconductor Optical Amplifier for C-Band Operation," In Optical Fiber Communication Conference, ThO1. Optical Society of America, 2003, 3 pages.

Clark, S., C. Martin, V. Kolinko, J. Lovberg, and P. J. Costianes, "A Real-Time Wide Field of View Passive Millimeter-Wave Imaging Camera," In Applied Imagery Pattern Recognition Workshop, Proceedings. 32nd, https://ieeexplore.ieee.org, 2003, 5 pages.

Di Falco, Andrea, Susanne C. Kehr, and Ulf Leonhardt, "Luneburg Lens in Silicon Photonics," Optics Express, vol. 19, No. 6, Mar. 2011, pp. 5156-5162.

Doylend, J. K., M. J. R. Heck, J. T. Bovington, J. D. Peters, L. A Coldren, and J.E. Bowers, "Two-Dimensional Free-Space Beam Steering with an Optical Phased Array on Silicon-on-Insulator," Optics Express, vol. 19, No. 22, Oct. 2011, p. 21595-21604.

Engelcke, M. et al., "Vote3Deep: Fast Object Detection in 3D Point Clouds Using Efficient Convolutional Neural Networks," arXiv:1609.06666v1, Sep. 21, 2016, 7 pages.

Friedlander, F. G., "A Dielectric-Lens Aerial for Wide-Angle Beam Scanning," Electrical Engineers—Part IIIA: Radiolocation, Journal of the Institution of Electrical Engineers, vol. 93, No. 4, May 1946, pp. 658-662.

(56) References Cited

OTHER PUBLICATIONS

Gabrielli, Lucas H., and Michal Lipson, "Integrated Luneburg Lens via Ultra-Strong Index Gradient on Silicon," Optics Express, vol. 19, No. 21, Sep. 2011, p. 20122-20127.

Galland, Christophe, Ran Ding, Nicholas C. Harris, Tom Baehr-Jones, and Michael Hochberg, "Broadband on-Chip Optical Non-Reciprocity Using Phase Modulators," Optics Express, vol. 21, No. 12, Optical Society of America, Jun. 2013, p. 14500-14511.

Hall, Leonard T., Hedley J. Hansen, and Derek Abbott, "2D Scanning Rotman Lens Structure for Smart Collision Avoidance Sensors," In Microelectronics, MEMS, and Nanotechnology, International Society for Optics and Photonics, Proceedings of SPIE, vol. 5274, 2004, pp. 93-99.

Hamam, Rafif E., Mihai Ibanescu, Steven G. Johnson, J. D. Joannopoulos, and Marin Soljačić, "Broadband Super-Collimation in a Hybrid Photonic Crystal Structure," Optics Express, vol. 17, No. 10, 2009, pp. 8109-8118.

Herd, J. S., and M. D. Conway, "The Evolution to Modern Phased Array Architectures," Proceedings of the IEEE, vol. 104, No. 3, Mar. 2016, pp. 519-529.

Herd, J. S., S. M. Duffy, and H. Steyskal, "Design Considerations and Results for an Overlapped Subarray Radar Antenna," In Aerospace Conference, 2005 IEEE, https://ieeexplore.ieee.org, 2005, 6 pages.

Hsu, Chia Wei, Bo Zhen, Jeongwon Lee, Song-Liang Chua, Steven G. Johnson, John D. Joannopoulos, and Marin Soljačić, "Observation of Trapped Light within the Radiation Continuum," Nature 499 (7457), http://nature.com, 2013, 3 pages.

Hulme, J. C. et al., "Fully integrated hybrid silicon two dimensional beam scanner," Optics Express, vol. 23, No. 5, Mar. 9, 2015, doi:10.1364/OE.23.005861, published Feb. 25, 2015, 14 pages.

Hulme, J.C., J. K. Doylend, M. J. R. Heck, J. D. Peters, M L. Davenport, J. T. Bovington, L.A. Coldren, and J.E. Bowers, "Fully Integrated Hybrid Silicon Free-Space Beam Steering Source with 32-Channel Phased Array," In SPIE OPTO, International Society for Optics and Photonics, https://spiedigitallibrary.org,2014, p. 898907-898907-15.

Hutchison, D. N. et al., "High-resolution aliasing-free optical beam steering," Optica, vol. 3, No. 8, Aug. 2016, pp. 887-890.

International Search Report and Written Opinion dated Sep. 1, 2017 from International Application No. PCT/US2017/038721, 14 pages.

Juodawlkis, P. W., J. J. Plant, W. Loh, L. J. Missaggia, F. J. O'Donnell, D. C. Oakley, A. Napoleone, J. Klamkin, J. Klamkin, J. T. Gopinath, D. J. Ripin, S. Gee, P. J. Delfyett, J. P. Donnelly, "High-Power, Low-Noise 1.5-µm Slab-Coupled Optical Waveguide (SCOW) Emitters: Physics, Devices, and Applications," IEEE Journal of Selected Topics in Quantum Electronics, vol. 17, No. 6, Nov./Dec. 2011, pp. 1698-1714.

Kwong, David, Amir Hosseini, John Covey, Yang Zhang, Xiaochuan Xu, Harish Subbaraman, and Ray T. Chen, "On-Chip Silicon Optical Phased Array for Two-Dimensional Beam Steering," Optics Letters, vol. 39, No. 4, Optical Society of America, Feb. 2014, pp. 941-944.

Peebles, A.L., "A Dielectric Bifocal Lens for Multibeam Antenna Applications," IEEE Transactions on Antennas and Propagation, vol. 36, No. 5, May 1988, pp. 599-606.

Poulton, C. et al., "Large-scale silicon nitride nanophotonic phased arrays at infrared and visible wavelengths," Optics Letters, Nov. 2016, Doc. ID: 275446, pp. 1-7.

Rao, J. B. L., "Multifocal Three-Dimensional Bootlace Lenses," IEEE Transactions on Antennas and Propagation, vol. AP-30, No. 6, Nov. 1982, pp. 1050-1056.

Richter, J., A. Hofmann, and L. P. Schmidt, "Dielectric Wide Angle Lenses for Millimeter-Wave Focal Plane Imaging," In Microwave Conference, 31st European, https://ieeexplore.ieee.org, 2001, 4 pages.

Ruze, J., "Wide-Angle Metal-Plate Optics," Proceedings of the IRE 38 (1), https://ieeexplore.ieee.org, Jan. 1950, pp. 53-59.

Schoenlinner, B., Xidong Wu, J. P. Ebling, G. V. Eleftheriades, and G. M. Rebeiz, "Wide-Scan Spherical-Lens Antennas for Automotive Radars," IEEE Transactions on Microwave Theory and Techniques, vol. 50, No. 9, Sep. 2002, pp. 2166-2175.

Schulwitz, L., and Amir Mortazawi, "A New Low Loss Rotman Lens Design Using a Graded Dielectric Substrate," IEEE Transactions on Microwave Theory and Techniques, vol. 56, No. 12, Dec. 2008, pp. 2734-2741.

Southall, H. L., and D. T. McGrath, "An Experimental Completely Overlapped Subarray Antenna," IEEE Transactions on Antennas and Propagation, vol. 34, No. 4, Apr. 1986, pp. 465-474.

Timurdogan, Erman, Cheryl M. Sorace-Agaskar, Jie Sun, Ehsan Shah Hosseini, Aleksandr Biberman, and Michael R. Watts, "An Ultralow Power Athermal Silicon Modulator," Nature Communications 5. Nature Publishing Group, http://www.nature.com/ncomms/2014/140611/ncomms5008/full/ncomms5008.html, 2014, 11 pages.

Van Acoleye, Karel, Wim Bogaerts, Jana Jagerska, Nicolas Le Thomas, Romuald Houdre, and Roel Baets, "Off-Chip Beam Steering with a One-Dimensional Optical Phased Array on Silicon-on-Insulator," Optics Letters, vol. 34, No. 9, Optical Society of America, May 2009, pp. 1477-1479.

Xie, Yiyuan, Jiang Xu, and Jianguo Zhang, "Elimination of Cross-Talk in Silicon-on-insulator Waveguide Crossings with Optimized Angle," Optical Engineering 50(6), International Society for Optics and Photonics, Jun. 2011, p. 064601-064601-4.

Yaacobi, Ami, Jie Sun, Michele Moresco, Gerald Leake, Douglas Coolbaugh, and Michael R. Watts, "Integrated Phased Array for Wide-Angle Beam Steering," Optics Letters, vol. 39, No. 15, Aug. 2014, pp. 4575-4578.

Zhang, Chong, Sudharsanan Srinivasan, Yongbo Tang, Martijn J. R. Heck, Michael L. Davenport, and John E. Bowers, "Low Threshold and High Speed Short Cavity Distributed Feedback Hybrid Silicon Lasers," Optics Express, vol. 22, No. 9, 2014, p. 10202-10209.

Zhen, Bo, Chia Wei Hsu, Ling Lu, A. Douglas Stone, and Marin Soljačić, "Topological Nature of Optical Bound States in the Continuum," Physical Review Letters, 113(25), Dec. 2014, p. 257401-1-5.

Kim, Design of a photonic crystal planar Luneburg lens for optical beam steering. Diss. Massachusetts Institute of Technology, 2019. 60 pages.

Morgan, "General solution of the Luneberg lens problem." Journal of Applied Physics 29.9 (1958): 1358-1368.

Southwell, "Index profiles for generalized Luneburg lenses and their use in planar optical waveguides." JOSA 67.8 (1977): 1010-1014.

Takahashi et al., "Design and fabrication of dielectric nanostructured Luneburg lens in optical frequencies." 2010 International Conference on Optical MEMS and Nanophotonics. IEEE, 2010. 2 pages.

* cited by examiner

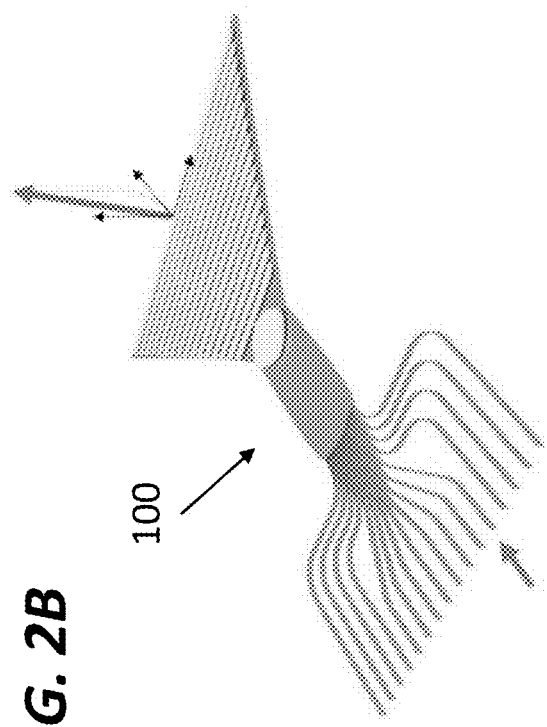
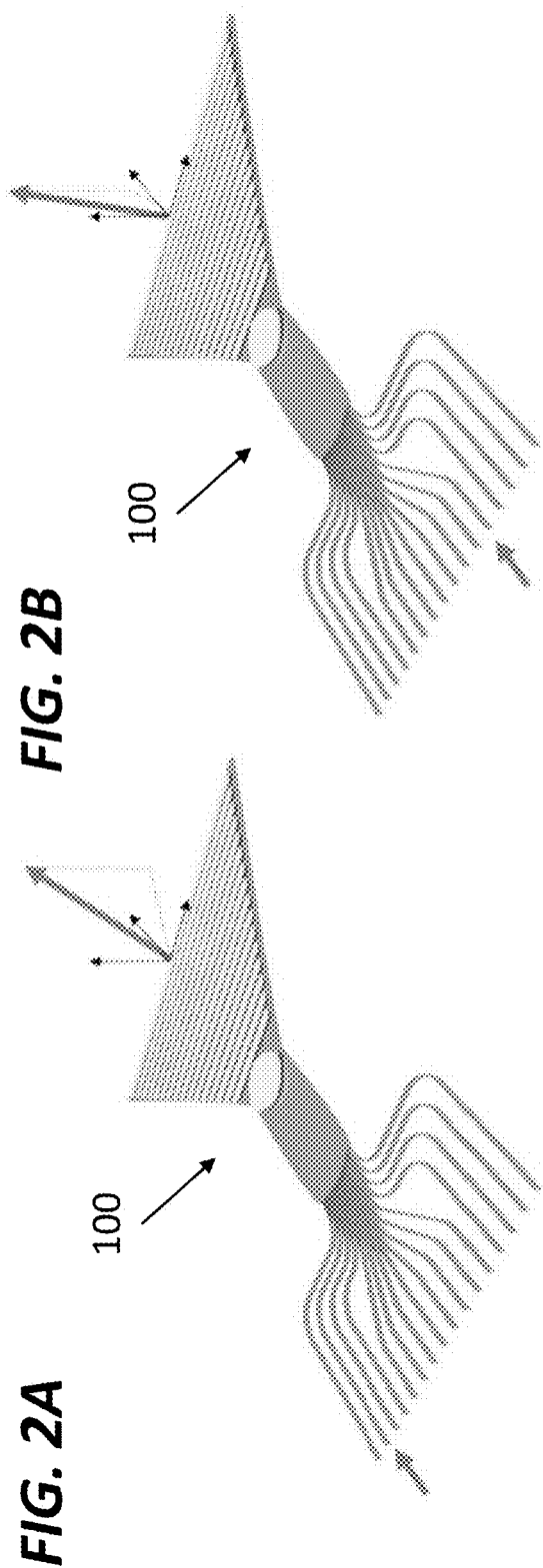
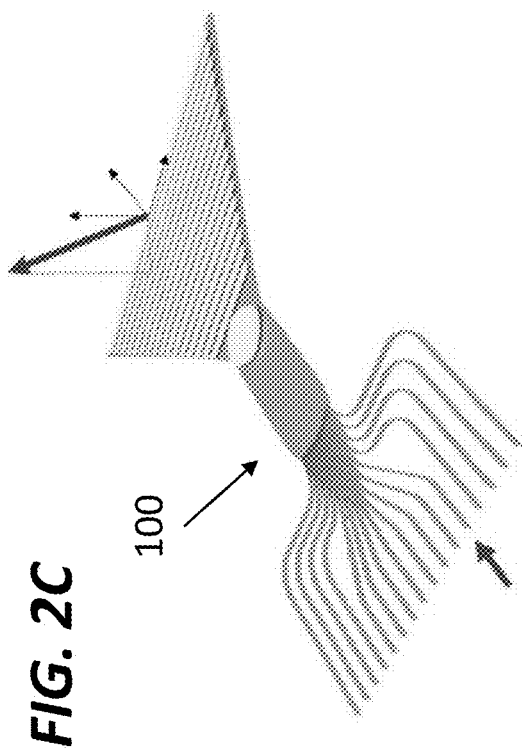
FIG. 2A
FIG. 2B
FIG. 2C

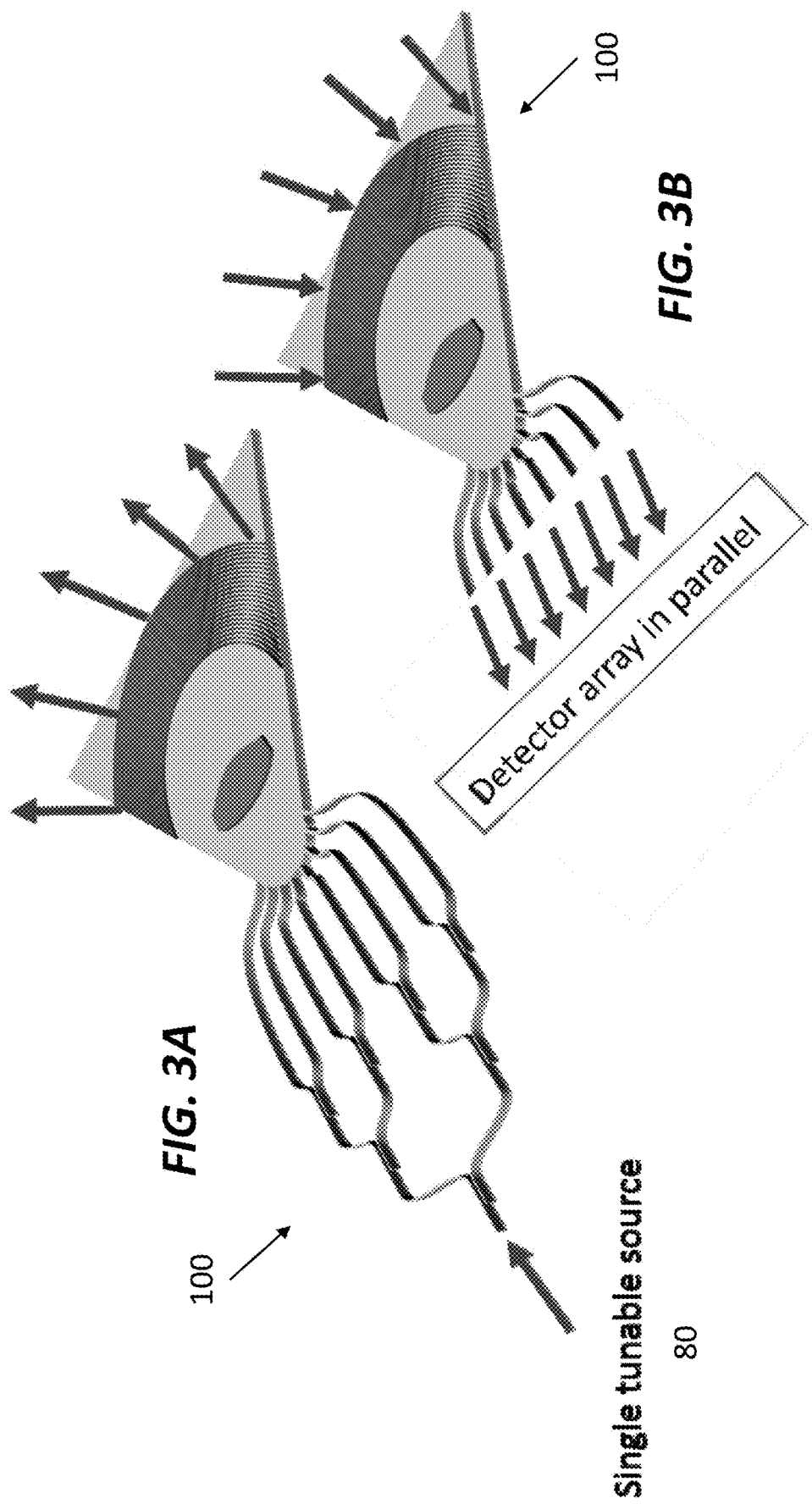

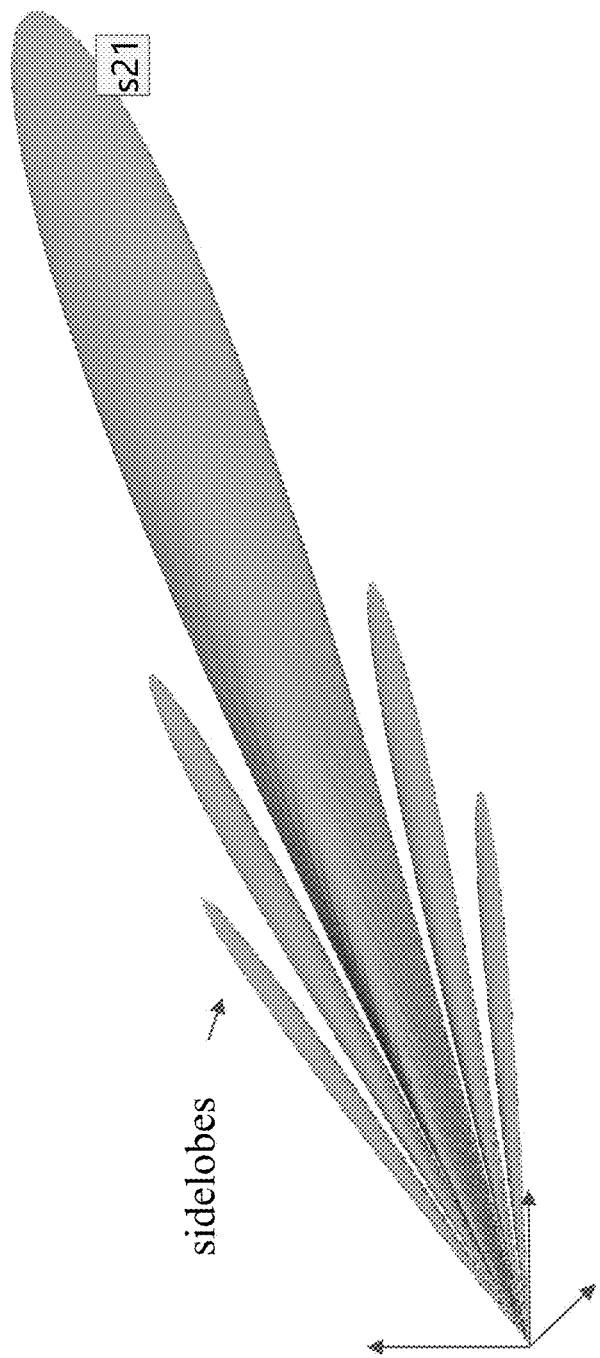

Lens-based architecture

Only ~log(N) switches needed in switch matrix for routing

Phase shifter architecture

~N thermal phase shifters needed to form beam

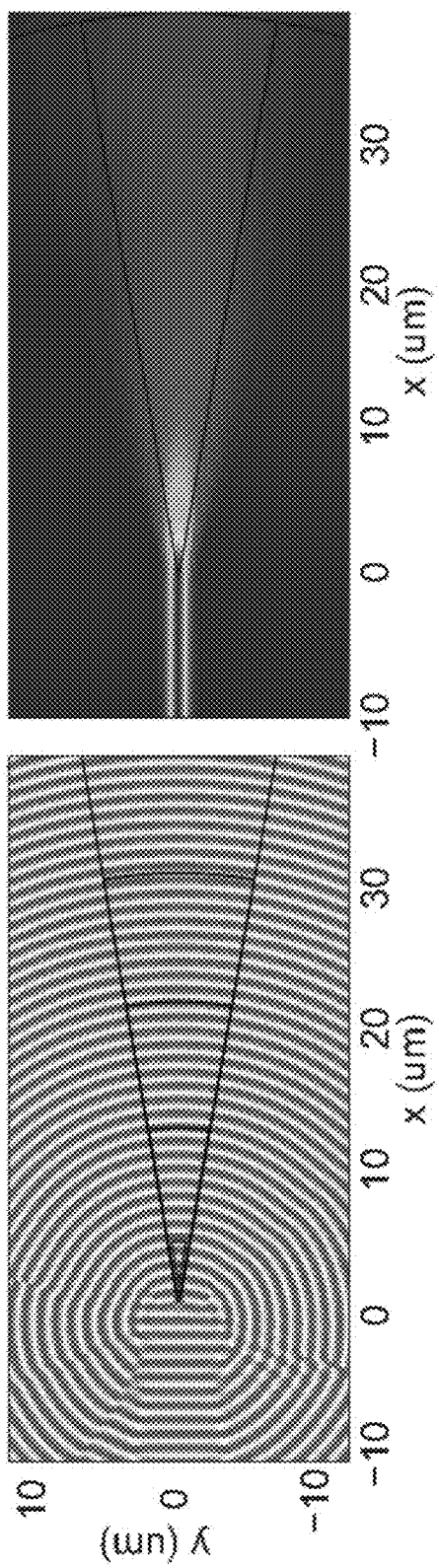
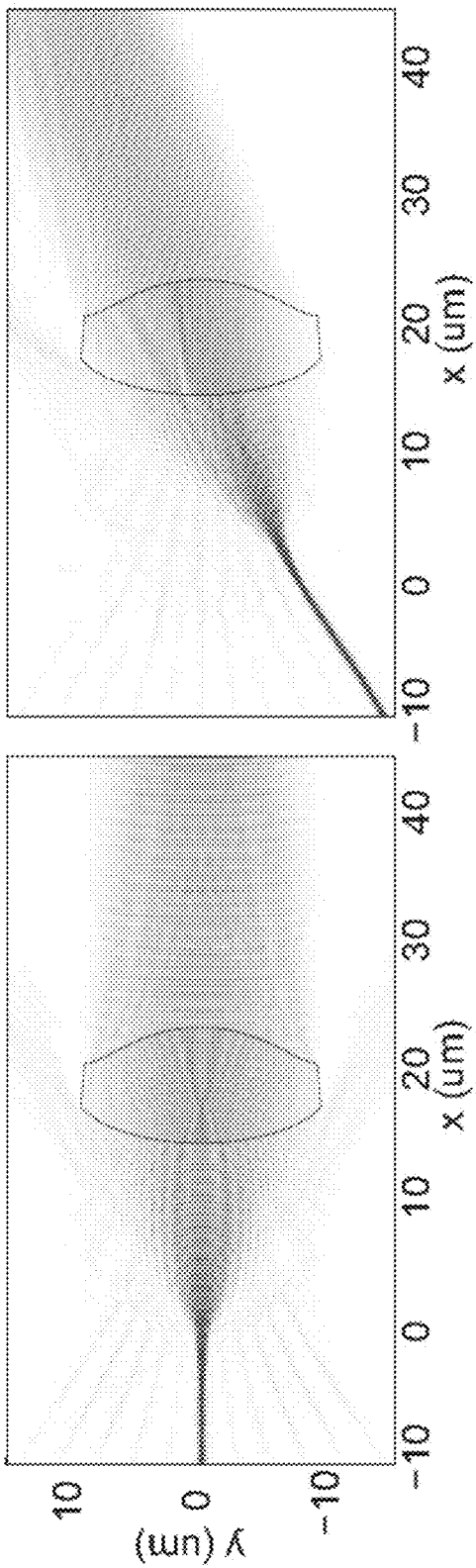
FIG. 12A
FIG. 12B
FIG. 12C
FIG. 12D

METHODS AND SYSTEMS FOR OPTICAL BEAM STEERING

CROSS-REFERENCE TO RELATED APPLICATIONS

This application is a continuation application of U.S. application Ser. No. 16/284,161, now U.S. Pat. No. 10,649,306, filed Feb. 25, 2019, and entitled "Methods and Systems for Optical Beam Steering," which is a continuation application of U.S. application Ser. No. 15/630,235, now U.S. Pat. No. 10,261,389, filed Jun. 22, 2017, and entitled "Methods and Systems for Optical Beam Steering," which in turn claims the priority benefit, under 35 U.S.C. § 119, of U.S. Application No. 62/353,136, filed Jun. 22, 2016, and entitled "Integrated Lens-Enabled LIDAR System." Each of these applications is incorporated by reference herein.

GOVERNMENT SUPPORT

This invention was made with Government support under Contract No. FA8721-05-C-0002 awarded by the U.S. Air Force. The Government has certain rights in the invention.

BACKGROUND

The meteoritic rise of autonomous navigation in real-world settings for self-driving cars and drones has propelled rapidly growing academic and commercial interest in LIDAR. One of the key application spaces that has yet to be filled, but is of great interest, is a non-mechanically steered LIDAR sensor which has substantial range (e.g., 100-300 m), low power (e.g., 1-10 W), low cost (e.g., hundreds of dollars), high resolution (e.g., $10^4$ to $10^6$ pixels) and small size (e.g., 10 cm$^3$). There are several candidate technologies including micro-mechanical mirrors, liquid-crystal based devices, and integrated photonics that are currently being explored academically and commercially to fill this niche.

Current state-of-the-art chip-scale integrated-photonic LIDARs are based on 1D or 2D phased array antennas. In this type of architecture, a 1D or 2D array of dielectric grating antennas is connected to electrically-controlled thermo-optic (TO) or electro-optic phase shifters. These phase shifters are fed by waveguides splitting off from one main dielectric waveguide which brings power from an off-chip or on-chip source. By applying a gradient to the phases tuning each antenna, in-plane or out-of-plane beam-steering can be enabled.

The direct predecessor of this architecture are radio frequency (RF) phased arrays developed for military and commercial RADARs. Although the detailed implementation is different because RF primarily relies on metallic waveguides and structures whereas integrated photonics uses dielectrics, optical phased arrays are essentially based on directly replacing RF components with their optical equivalents. This direct translation brings a significant disadvantage: whereas metallic waveguides can be spaced at sub-wavelength pitches, eliminating parasitic grating lobes, dielectric waveguides have to be separated by several wavelengths to prevent excessive coupling, resulting in significant grating lobes.

RF phased array radars are routinely produced with closely spaced antennas ($<\lambda/2$ apart) in subarrays that can be tiled to create very large apertures. This provides wide-angle steering and scaling to large power-aperture designs. Fundamentally, the radiating elements can be closely spaced with independent control circuitry because the amplifiers, phase shifters and switches in the RF are implemented as subwavelength lumped elements.

Current chip-scale optical phased arrays often reproduce RF phased array architectures, with RF elements replaced with their optical analogs. Fundamentally, the optical analogs to RF components are traveling-wave designs that are multiple wavelengths long and spaced apart by more than $\lambda/2$. This design allows beam-steering over very small angles. In an end-fed geometry, for example, the grating antenna elements can be closely spaced for wide-angle azimuthal steering and use wavelength tuning to change the out-coupling angle of the gratings for elevation steering. But this end-fed geometry cannot be tiled without introducing significant grating lobes due to its sparsity.

SUMMARY

Embodiments of the present technology include an optical beam steering apparatus comprising a substrate, a plurality of waveguides formed on the substrate, a planar dielectric lens formed on the substrate in optical communication with the waveguides, and an output coupler formed on the substrate in optical communication with the planar dielectric lens. In operation, the waveguides comprise a first waveguide and a second waveguide. The planar dielectric lens collimates light emitted by the first waveguide as a first collimated beam propagating in a first direction in a plane of the substrate and collimates light emitted by the second waveguide as a second collimated beam propagating in a second direction in the plane of the substrate different than the first direction. And the output coupler guides the first collimated beam in the first direction and the second collimated beam in the second direction and couples at least a portion of the first collimated beam and the second collimated beam out of the plane of the substrate.

The optical beam steering apparatus may include at least 32, 100, or 1000 waveguides in optical communication with the planar dielectric lens. The light emitted by these waveguides may not be phase coherent (e.g., the first waveguide may have an arbitrary phase relative to the light emitted by the second waveguide).

The planar dielectric lens may have a shape selected to satisfy the Abbé sine condition. It can have a single focal point or multiple (i.e., two or more) focal points.

The output coupler can comprise a one-dimensional grating configured to diffract the first collimated beam and the second collimated beam out of the plane of the substrate. It could also include a two-dimensional photonic crystal that couples the first and second collimated beams out of the substrate.

Examples of such an optical beam steering apparatus may also include a tunable light source in optical communication with the waveguides. This tunable light source tunes a wavelength of the light emitted by the first waveguide and the light emitted by the second waveguide. For instance, the tunable light source may tune the wavelength to steer the first collimated beam to one of at least 15, 50, 100, or 1000 resolvable angles with respect to a surface normal of the plane of the substrate.

These examples may also include a network of optical switches formed on the substrate in optical communication with the tunable light source and the waveguides. This network guides the light emitted by the first waveguide from the tunable light source to the first waveguide when in a first state and guides the light emitted by the second waveguide from the tunable light source to the second waveguide when in a second state. In cases where there are N waveguides, switching from the first state to the second state involves actuating up to $\log_2 N$ optical switches in the network of optical switches. The optical beam steering apparatus may also include a plurality of optical amplifiers formed on the substrate in optical communication with the network of optical switches and the waveguides. These amplifiers amplify the light emitted by the first waveguide and the light emitted by the second waveguide.

Other examples of the present technology include a lidar with a light source, a network of optical switches, a planar dielectric lens, and a periodic structure. In operation, the light source emits a beam of light. The network of optical switches, which are in optical communication with the tunable light source, guides the beam of light to a first waveguide in a plurality of waveguides. The planar dielectric lens, which is in optical communication with the waveguides and has a shape selected to satisfy the Abbé sine condition, collimates the beam of light emitted by the first waveguide as a first collimated beam propagating in a first direction. And the periodic structure, which is in optical communication with the planar dielectric lens, diffracts at least a portion of the first collimated beam at an angle with respect to the first direction.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2A-2C show illustrate steering an optical beam with the optical beam-forming device of FIG. 1A.

FIGS. 3A and 3B illustrate transmitting and receiving, respectively, with the optical beam-forming device of FIG. 1A.

FIG. 4B shows the simulated far-field directivity and far-field beam angles for the ideal aperture given in FIG. 4A

FIG. 12A shows a simulation of a far-field beam pattern to extract phase center.

FIG. 12B shows a simulation of a far-field beam pattern to extract gaussian beamwidth.

FIG. 12C shows a 2D simulation of on-axis port excitation of a lens feed.

FIG. 12D shows a 2D simulation of off-axis port excitation of the lens feed.

DETAILED DESCRIPTION

Although the optical analogy to RF phased arrays has been well explored, there is an entire class of planar-lens based devices developed in the RADAR literature that performs the same function as an RF phased array with integrated-photonics analogs. Instead of relying upon many continuously tuned thermal phase shifters to steer beams, an integrated-photonics device excites the focal plane of a specially designed planar lenses to generate a discrete far-field beam.

This approach to making an on-chip beam-steering device (e.g., for LIDAR applications) starts with widely-spaced transmit/receive waveguides (>10λ, apart) that include SOAs, phase shifters, directional couplers, and RF photodiodes. The beam-steering device uses a wide-angle planar dielectric lens—an optical equivalent of a Rotman lens for RF beamforming—to convert the sparse array of waveguides into a dense array of output waveguides (~λ/2 apart) to enable wide-angle steering. Exciting a given input port to the planar dielectric lens steers the beam in the plane of the lens, and changing the beam's wavelength steers the beam out of the plane.

This device can be tiled with optical overlapped subarrays to suppress sidelobes. These passive beamforming structures can be realized using silicon technology and may be butt-coupled to active photonic chips that provide the active transmit/receive functions. Fixed phase shifts in the beam-former chip could create a sinc-like pattern in the near-field in the vertical direction. This transforms into a rectangular beam pattern in the far-field, suppressing the sidelobes. Advantages of using passive beamformers with overlapped subarrays include: (1) a dramatic reduction in the number of control lines needed; and (2) much reduced electrical power dissipation per chip.

Optical Beam-Steering Device Architectures

Figure 1A:
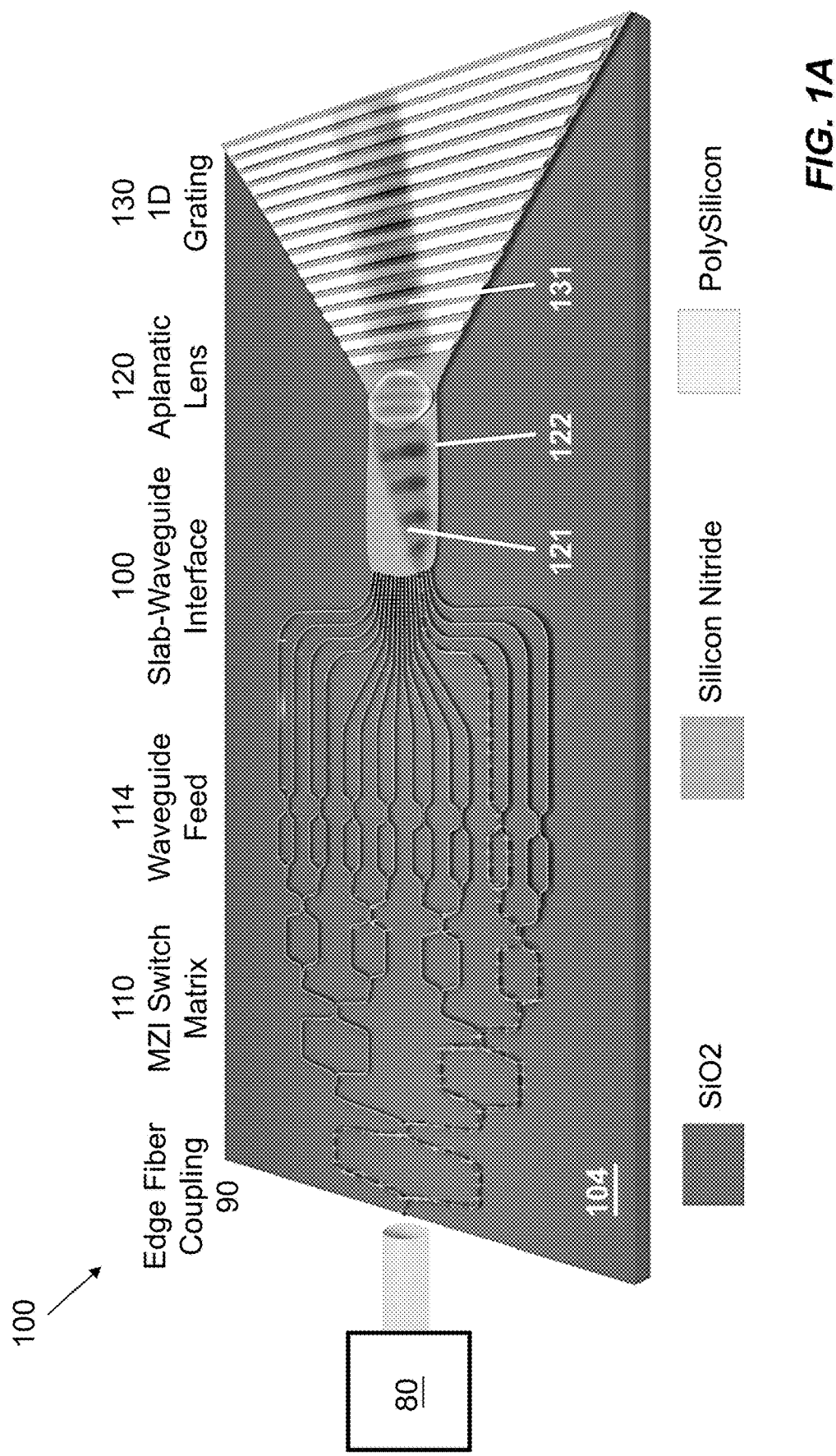
FIG. 1A shows an optical beam-forming device with a planar dielectric lenses.

FIG. 1A shows an example lens-enabled integrated photonic LIDAR system 100 with light propagating through each component of the system 100, which is formed on a substrate 104. Light is coupled into the system from a fiber 90 via an on-chip waveguide 102. The waveguide 102 is formed by a 200 nm thick and 1 µm wide Silicon Nitride (SiN) section encapsulated in $SiO_2$ (an upper $SiO_2$ layer is omitted from the diagram). This fiber 90 connects to a tunable IR source 80 that emits light centered at a wavelength of about 1550 nm. The light source 80 can be mated or bonded to the substrate 102 or integrated onto the substrate 102. There may also be a preamplifier coupled between the light source 80 and the fiber 90 or disposed on the substrate 104 in optical communication with the waveguide 102 to amplify the input beam from the light source 80.

The waveguide 102 guides the light from the IR source 80 to a switch matrix 110 composed of Mach-Zehnder interferometers (MZIs) 112. The MZIs 112 can switch the input into any one of $2^D$ output ports 114, where D is the depth of the tree in the switch matrix 110. The optical path length of at least one arm of each MZI 112 is controlled by an integrated thermo-optic (TO) phase shifter (not shown; external electronic control lines are also omitted), which allows the optical beam to be electronically switched between two output ports 114.

The system 100 may also include semiconductor optical amplifiers (SOAs; not shown) integrated on the substrate 104 before or after the switch matrix 110. These SOAs can be turned on and off, depending on whether or not light is propagating through them, to reduce power consumption.

Figure 1C:
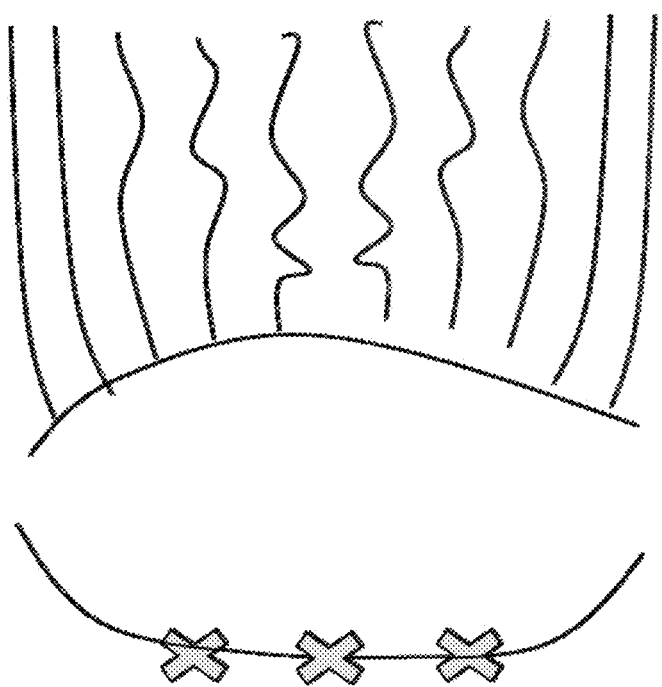
FIG. 1C shows a bootlace lens suitable for use in an optical beam-forming device like the one shown in FIG. 1A.
Figure 1B:
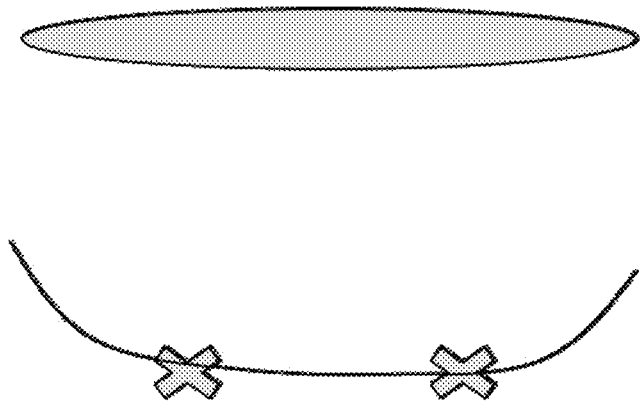
FIG. 1B shows a bifocal lens suitable for use in an optical beam-forming device like the one shown in FIG. 1A.

Each output from the switch matrix 110 feeds into a slab waveguide 122 that is patterned to form the focal surface of a wide-angle planar dielectric lens 120, also called an aplanatic lens. This lens may obey the Abbé Sine condition and has a lens shape designed for wide-angle steering. There are many different shapes and structures that provide wide-angle steering, including a basic parabolic shape for the lens. Other lens shapes are also possible, including those for a bifocal lens (shown in FIG. 1B), bootlace lens (shown in FIG. 1C), integrated Luneburg lens, Rotman lens, or standard compound lens, such as an achromatic doublet.

The light 121 rapidly diffracts upon entering the slab waveguide 122 until being collimated by the aplanatic lens 120. The lens 120 is formed by a patterned PolySi layer 20 nm or 40 nm thick. The collimated beam 121 propagates into a output coupler, implemented here as a one-dimensional (1D) grating 130 that guides the collimated beam 121 within the plane of the substrate and scatters the collimated beam out of the plane of the substrate 104 and into free-space. The grating 130 is formed out of a PolySi layer the same height as the aplanatic lens 120.

In other examples, the lens redirects the beam without collimating it to a curved grating (instead of the straight grating 130 shown in FIG. 1A). The curved grating's curvature is selected to collimate the beam redirected by the lens. In other words, the lens and curved grating work together to produce a collimated beam.

The MZI switch matrix 120 can be replaced by a 3 dB splitting tree (not shown) that illuminates all of the input ports 114 in parallel. In this implementation, beam-steering of this "fan-beam" is accomplished through frequency tuning. A separate aperture with an array of detectors processes the LIDAR return. At 100 m, a raster scan for a megapixel scale sensor would take 1 second, based on time-of-flight—far too slow for most applications—whereas parallelization can allow an acquisition on the scale of milliseconds. The tradeoff is that the power requirements are increased by a factor of N and more detector hardware is required.

In other embodiments, the output coupler is implemented as a two-dimensional (2D) photonic crystal instead of a 1D grating. For instance, photonic crystal resonances based on bound states in the continuum (BIC) can implement the out-of-plane steering. BICs are infinite quality factor resonances arising due to interference effects. For a broad range of neighboring wave vector points, the quality factor is also very high, potentially enabling large scale photonic structures with efficient and focused emission across a wide range of directions.

One factor enabling improved performance of a 2D photonic crystal relative to other output couplers is the rigorously optimal radiation quality factor of BICs. BIC photonic crystal gratings can have quality factors as high as $10^5$, enabling propagation over the order of $10^5$ periods, or 10 cm, before significantly attenuating. These can easily be used to not just make 50% illuminated, 1 mm long gratings, but even 70% and 95% illuminated, 1 cm long gratings. Slight tuning of the structure can change the quality factor and allow the output to be tapered for a more even aperture power distribution and a smaller beamwidth in the far field.

The BICs close to k=0 points, protected by symmetry mismatch between the electromagnetic resonance and radiation continuum, feature many additional desirable properties. The relatively flat and homogeneous bands here allow rapid tuning rates of the emission direction by slightly tuning the frequency of excitation. The angular tuning rate can be estimated as a function of frequency using the following simple relation $d\theta = d\omega/\omega * n_{group}$, where $n_{group}$ is the group index of the band. For $n_{group}=3$, this yields a standard tuning rate of 0.1 degrees/nm at 1500 nm. Using a flat band with $n_{group}$ as high as 10, the expected tuning rates are about 0.4 degrees/nm, allowing a potential reduction in the required bandwidth and tuning range of on-chip devices by a factor of 2 or more.

In addition, the radiation field can also be designed to be highly asymmetric by breaking the top-down mirror symmetry of the structure, so that light can be more efficiently collected into the desired direction. This enables lower losses and fewer interference effects from radiation into the substrate.

Finally, a common problem with arrays of dielectric grating antennas in conventional optical beam-steering devices is their sensitivity to coupling at wavelength scale pitches. 2D photonic crystals do not exhibit this problem because they are designed for the strong "coupling" regime: the entire structure is wavelength scale.

This reduced sensitivity comes at a price. The in-plane steering and out-of-plane steering are no longer separately controlled by on-chip beamforming or frequency-tuning: there is a mixture. Despite this, it is possible to map a given set of frequency and port settings to a given set of beam angles with a lookup table.

Non-Mechanical Optical Beam Steering with a Planar Dielectric Lens

FIGS. 2A-2C illustrate non-mechanical beam steering for the chip 100 shown in FIG. 1A. Non-mechanical beam steering is implemented by two mechanisms. The first is port switching, which changes the in-plane propagation direction of the beam as shown in FIGS. 2A and 2B. The desired input port, and hence the desired in-plane propagation direction, can be selected by setting the MZIs 112 in the optical switching matrix 110 to route the input beam. Thus, there may be up to one resolvable in-plane angle for each input port to the planar dielectric lens. Systems with 32, 100, 1000, or 10,000 input ports would have up to 32, 100, 1000, or 10,000 resolvable in-plane steering angles, respectively.

As depicted in FIGS. 2B and 2C, the wavelength roughly controls the out-of-plane angle, that is, the angle between the beam center and the z-axis. Thus, there may be up to one resolvable out-of-plane angle for each wavelength resolvable by the output coupler. For example, systems with gratings that can resolve 15, 50, 100, or 1000 angles would have up to 15, 50, 100, or 1000 resolvable out-of-plane steering angles, respectively.

These 2D beam steering mechanisms are similar to those of RF Rotman lenses feeding arrays of patch antennas. The 3D directivity patterns of the generated beams are depicted in each subfigure. The precise mathematical relationship between the emission angles and the analytic form of the directivity pattern are detailed below.

FIGS. 3A and 3B show how the system can be used to transmit and receive, respectively. Transmission works as described above: exciting an input to the planar dielectric lens yields a plane wave that propagates in a given direction within the plane of the lens, and tuning the wavelength changes the propagation angle with respect to the surface normal of the plane of the lens. Receiving works in reverse: the grating collects incident light, and the lens focuses the incident light on the input port associated with the corresponding in-plane angle-of-arrival. The out-of-plane angle of arrival corresponds to the angle with the strongest transmission, which represents a direct "reflection" from the object being interrogated. The coupler may be illuminated by light from other angles, e.g., caused by scattering or indirect "reflections," but this light generally is not properly phased-matched to the grating and therefore does not efficiently couple into the grating.

To better understand the system's operation, consider an ideally preforming aperture. In operation, an ideal implementation of the planar dielectric lens generates a plane wave propagating at a finite angle. The scattered light from the plane wave propagation through the 1D grating forms the near-field of the radiation pattern. Assuming that the plane wave emitted from the lens is uniform, that the lens introduces negligible aberrations, and that the lens and grating parameters are wavelength and angle independent yields a simplified aperture pattern of the following form:

$$A(x, y) = \begin{cases} \exp(-qx)\exp(ik_0 u_{x0} x)\exp(ik_0 u_{y0} y) & \begin{array}{l} 0 \le x \le L, \\ -\frac{W}{2} + x\tan(\phi') \le y \le \frac{W}{2} x\tan(\phi') \end{array} \\ 0 & \text{else} \end{cases}$$

Figure 4A:
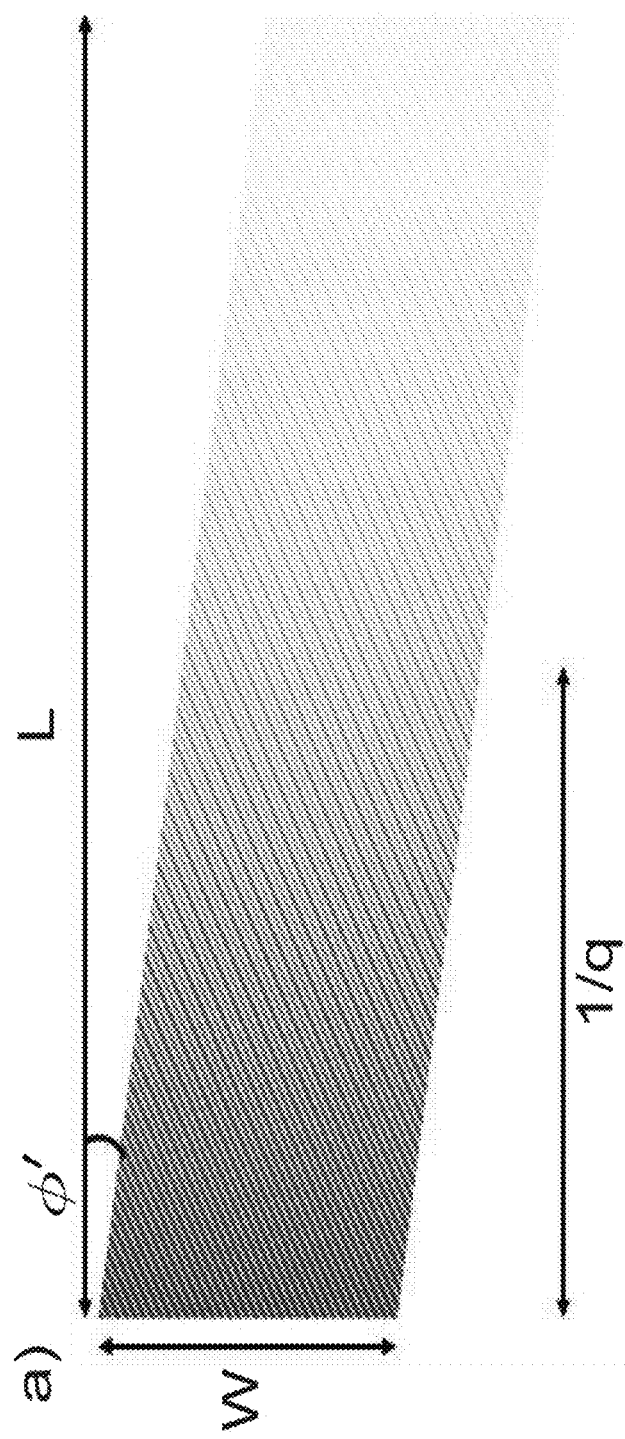
FIG. 4A shows a simulated aperture pattern of an optical beam-forming device with a planar dielectric lens.

FIG. 4A shows this ideal near-field aperture pattern. The pattern in FIG. 4A can be thought of as a parallelogram with uniform amplitude in the y-direction, and exponentially decaying amplitude in the x-direction, determined by the grating decay parameter q where L is the length of the grating and W is the width. The inclination of the parallelogram is determined by the grating propagation angle $\phi'$, which is derived below and is close in magnitude to the propagation angle of the beam output from the lens $\phi_{in}$.

$u_{x,0}=\sin(\phi_0)\cos(\theta_0)$ and $u_{y,0}=\sin(\phi_0)\sin(\theta_0)$ characterize the direction of the emitted mode and can be calculated by tracking the phase accumulated by the collimated rays emitted from the lens and discretely sampling them at the grating teeth. As shown below, these can write these as:

$$u_{y,0} = n_1 \sin(\phi_{in}) \tag{1}$$

$$u_{x,0} = \frac{k_{x,avg}(\phi_{in})}{k_0} - \frac{\frac{2\pi m}{\Lambda}}{k_0}$$

where $k_{x,avg}$ is the average k component in the grating, $n_1$ is the effective index of the TE slab mode in the lens, m is the grating order, and $\Lambda$ is the grating period. The function of the grating can be understood from this equation: it allows phase matching to radiating modes through the addition of the crystal momentum $2\pi m/\Lambda$.

Making the approximation $k_{avg} \approx n_{eff} k_0 \cos(\phi_{in})$, where $n_{eff}$ is the average effective index of the gratings, makes it possible to show that $u_{x0}$ and $u_{y0}$ satisfy an elliptical equation:

$$\left[\frac{u_{x,0} + \frac{m\lambda}{\Lambda}}{n_{eff}}\right]^2 + \left[\frac{u_{y,0}}{n_1}\right]^2 = 1 \tag{2}$$

Figure 6B:
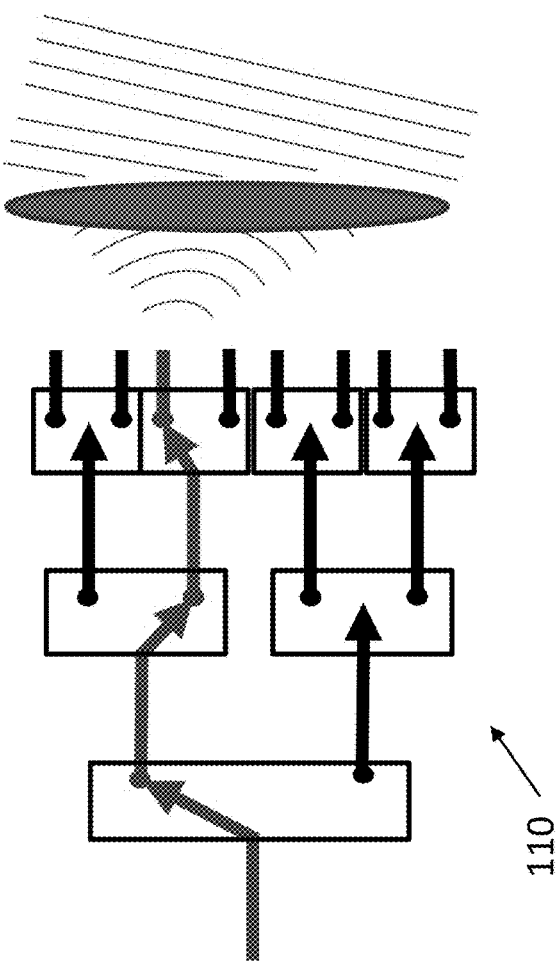
FIG. 6B illustrates beam steering with a planar dielectric lens and switch matrix.

This elliptical equation has a simple physical interpretation. Switching ports in-plane takes us along an elliptical arc in $u_{x,0}$ and $u_{y,0}$ space, while tuning the wavelength $\lambda$ tunes this arc forward and backwards as depicted in FIG. 6B (described below).

Analytically calculating the directivity, which characterizes the far-field distribution of radiation, yields:

$$D(\Delta u_x, \Delta u_y) = \frac{W k_0^2 \cos(\theta_0)}{\pi q(1 - \exp(-2qL))} \frac{\mathrm{sinc}^2\left(\frac{W}{2} k_0 \Delta u_y\right)}{1 + \frac{k_0^2}{q^2}(\Delta u_x + \tan(\phi')\Delta u_y)^2} \times \tag{3}$$

$$(1 - 2\cos(k_0 L(\Delta u_x + \tan(\phi')\Delta u_y))\exp(-qL) + \exp(-2qL))$$

where $\Delta u_x = u_x - u_{x,0}$ and $\Delta u_y = u_y - u_{y,0}$.

FIG. 4B is a plot of the computed far-field directivity and far-field beam angles given in Eq. (3) for the ideal aperture given in FIG. 4A. The peaks to the left and right of the main beam are known as sidelobes and originate from the sinc factor in the directivity function. There are several recognizable features to this function, such as the sinc from the rectangular aperture and the $1/(k_0^2+q^2)$ from the exponential decay. The tan 0' components introduce a "shear" into the beam spots and come directly from the tilted aperture pattern.

This result can be used to calculate estimates for the number of resolvable points for port switching and wavelength steering. Specifically, for wavelength tuning, the result is:

$$N_{wavelength} \approx Q n_{eff} \frac{\Delta\lambda}{\lambda_0} \frac{v_g}{c} + 1 \tag{4}$$

where Q is the quality factor of the grating, $v_g$ is the group velocity of propagation in the grating, and $\Delta\lambda$ is the bandwidth. This expression exactly resembles what would be extracted from other phase-shifter based architectures which rely on frequency tuning for beam-steering in one direction. The number of resolvable points for steering in plane is approximately:

$$N_{in\text{-}plane} \approx \frac{2D_{peak}}{3} = \frac{2\pi W}{3\lambda} \quad (5)$$

Planar Dielectric Lens Design

The wide-angle planar dielectric lens has a shape selected to satisfy the Abbé Sine condition, which eliminates the Coma aberration. Lenses designed this way tend to have good off-angle performance to ±20° or 30°. In practice, this quantity can translate to a field of view of 80° or more in $\phi_0$. The lens design depends on the focal length, lens thickness, and lens index (the ratio of effective indices of a transverse electric (TE) mode in a SiN slab ($n_2$) to a SiN slab with a layer of PolySi ($n_1$)). After creating the lens, the focal plane can be identified by conducting ray-tracing through the lens and optimizing the feed position and angle based on maximizing the 2D directivity from the 1D aperture pattern computed from ray-tracing.

Figure 5A:
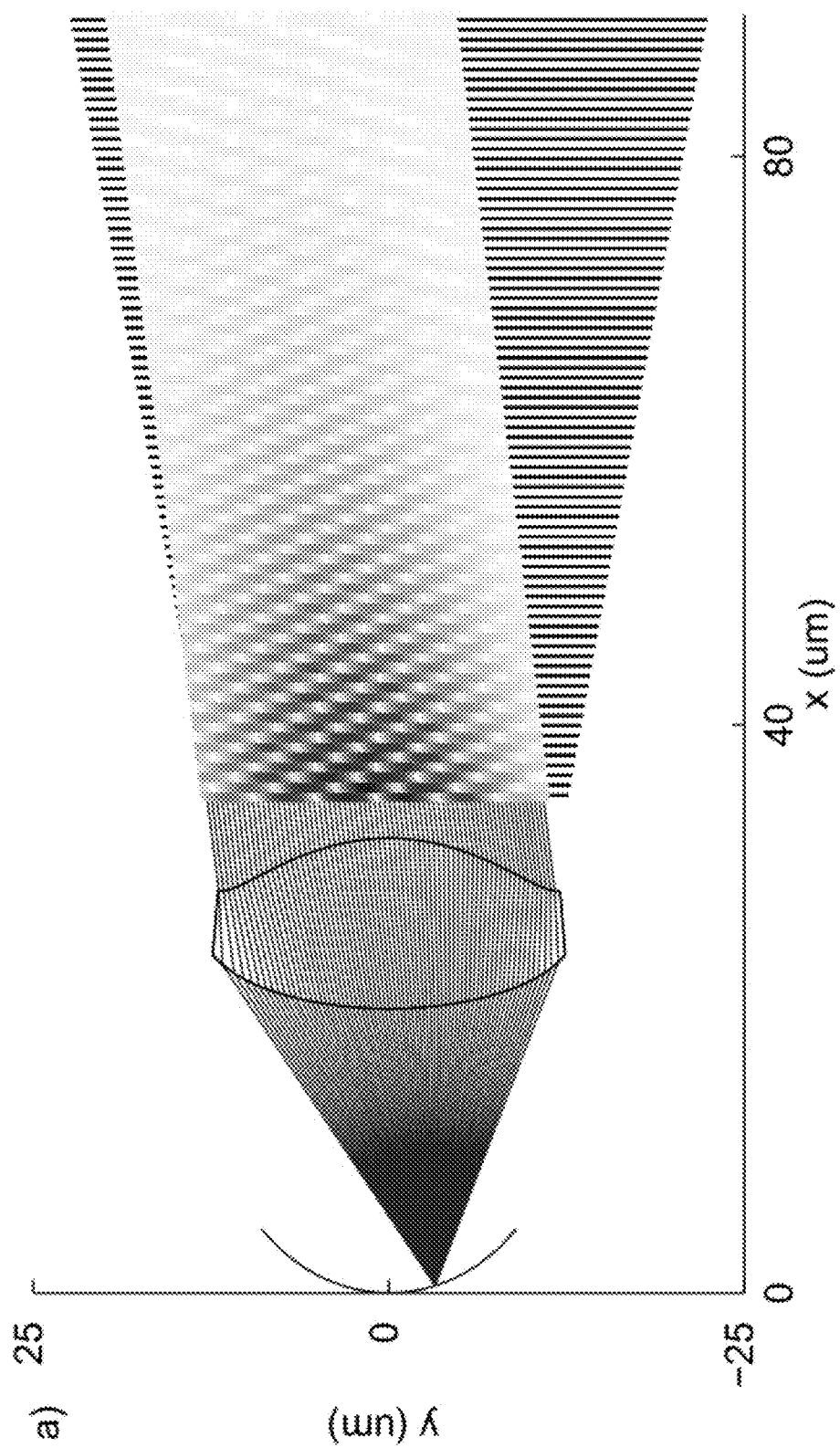
FIG. 5A shows ray-tracing simulations used to determine the optimal port position and relative angle.
Figure 5B:
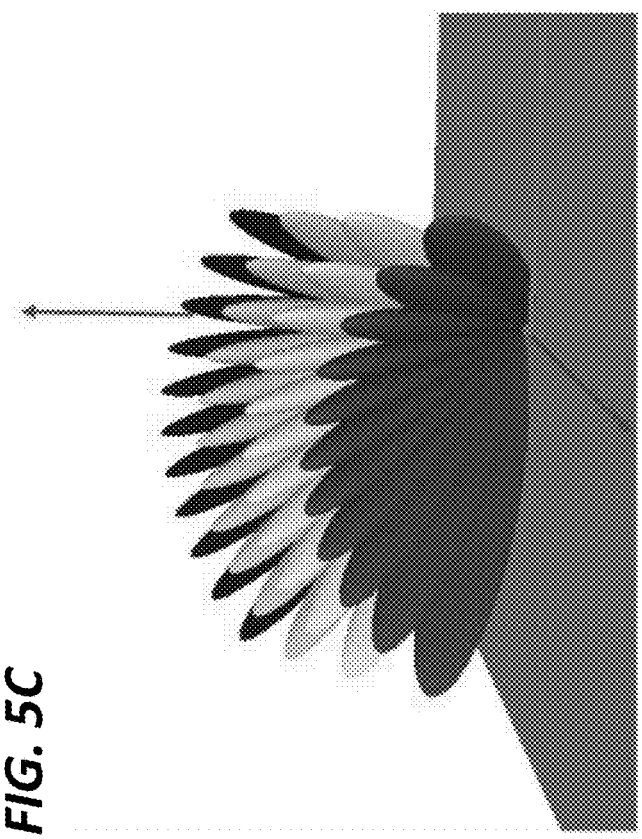
FIG. 5B is a heat plot showing far-field beam spots in $u_x$ and $u_y$ space.
Figure 5C:
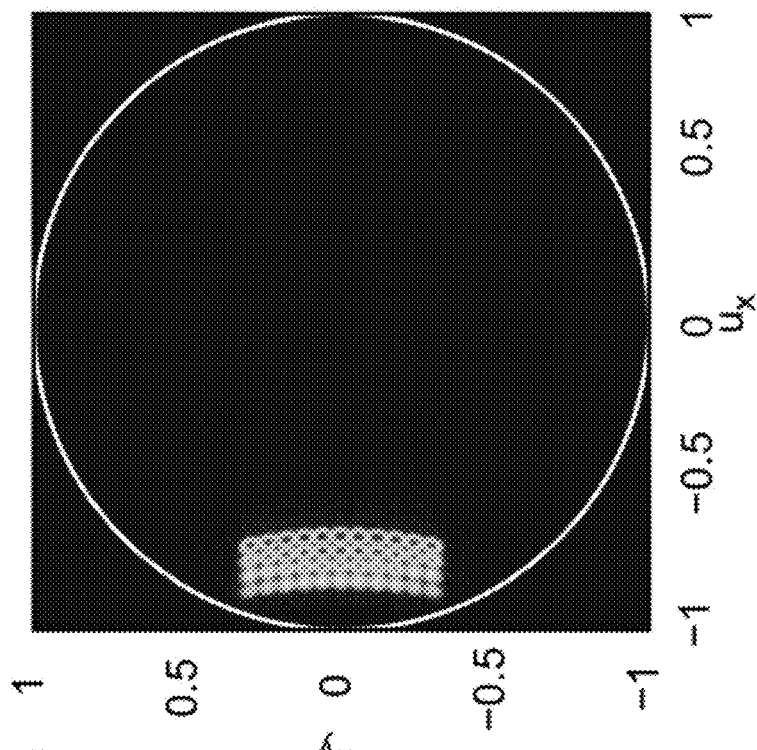
FIG. 5C shows three-dimensional (3D) beam patterns corresponding to those in FIG. 5B.

Following this, ray tracing is done through the grating to compute the full 3D directivity for several optimized port locations and angles. The aperture pattern can be extracted from ray-tracing through the grating in the following way:

$$A(x,y) = \left[ \sum_{n=0}^{N_{rays}} \sum_{m=0}^{N_{grat}} \sqrt{P_{n,m}} \, \delta(x - m\Lambda) \delta(y - y_{n,m}) \exp(-qx) \exp(i\phi_{n,m}) \right] \quad (6)$$

where the ray amplitudes $P_{n,m}$ and accumulated ray phases $\phi_{n,m}$ are discretely sampled for all $N_{ray}$ by $N_{grat}$ ray-grating intersections at $[x_{n,m}, y_{n,m}]$. The physical interpretation of this is that each ray-grating intersection acts as a point radiation source driven by the traveling wave (see below). An artificially "added" amplitude decay of $\exp(-qx)$ accounts for the grating radiation as the rays propagate. The power associated with a given ray-grating intersection $P_{n,m}$ is calculated from the feed power based on conservation arguments: $P_{feed}(\phi)d\phi = P_{n,m}(y)dy_{n,m}$ FIGS. 5A-5C illustrate a full ray-tracing calculation and a 2D aperture pattern extracted by this method for lens-enabled chip-scale LIDAR generated with $\lambda_0 = 1.55$ μm, $q = 0.025$ μm$^{-1}$, $\Lambda = 700$ nm, duty cycle=0.1, feed beamwidth of 15°, and effective indices $n_1 = 1.39$ and $n_2 = 1.96$. In FIG. 5A, ray-tracing simulations are used to determine the optimal port position and relative angle. These rays are traced through the grating and form an aperture pattern. The Fourier transform of the aperture gives the Far-field pattern. Numerical details of effective index calculations, port phase center, and feed patterns are detailed below.

FIG. 5B is a heat plot showing far-field beam spots in $u_x$ and $u_y$ space. The location of these ports is governed by the equations above, where the beams along the elliptical curve are generated from port switching, while the points formed from translating the ellipse to the right and left correspond to frequency tuning over ±50 nm around $\lambda_0 = 1.55$ μm. FIG. 5C shows three-dimensional (3D) beam patterns corresponding to those in FIG. 5B. The different shadings indicate the different wavelengths used to generate the beam. The drooping effect of the beams as they turn off-axis is caused by increasing in-plane momentum.

Ray-tracing through the grating is valid in the regime where the grating teeth individually cause low radiation loss and small incoherent reflections (i.e., the excitation frequency is far from the Bragg bandgap). When correct, this method is useful because it can be used to compute the aperture pattern quickly for a large many-wavelength structure while including the effects of lens aberrations and a nonuniform power distribution, two features which would be difficult to model analytically, and very costly to simulate through 2D or 3D finite-difference time-domain (FDTD) techniques.

Following standard RADAR design procedures, once a set of far-field 3D directivity patterns are calculated, new ports are placed to overlap the gain at each port by 3 dB to provide suitable coverage in the field of view. To confirm the successful operation of this design, the aperture patterns for multiple wavelengths between 1500 and 1600 nm are calculated for all ports. The wavelength dependence of the effective indices and the grating decay factor q are included. Directivity patterns are plotted in $u_x, u_y$ space for a range of wavelengths in FIG. 5B, where the 3 dB overlapped ports lie along an elliptical arc, and where the arc is translated forward and backward by tuning the wavelength. These same beams are plotted in 3D in FIG. 5C. Note that beams towards the edge of the field of view tend to "fall-into" the device plane because of increasing in-plane momentum (see below).

Ray-tracing is one method that can be used to design an optical beam-steering chip with a planar dielectric lens. The parameters used for this method, such as the port phase centers, feed beam width, grating decay length, and the effective indices, can be extracted from other calculations. In addition, many other simulations may be undertaken to validate the assumptions of our ray-tracing computations to account for second order effects. Finally, the outcome of the ray-tracing calculations may be compared to the analytically predicted directivity functions and beam directions to assess the performance and validity. Once a design is validated, cadence layouts of the necessary components can be generated automatically and verified to ensure they satisfy design rule checks based on fabrication limitations and other physics-based constraints.

Performance of Optical Beam Steering with a Planar Dielectric Lens

Figure 6A:
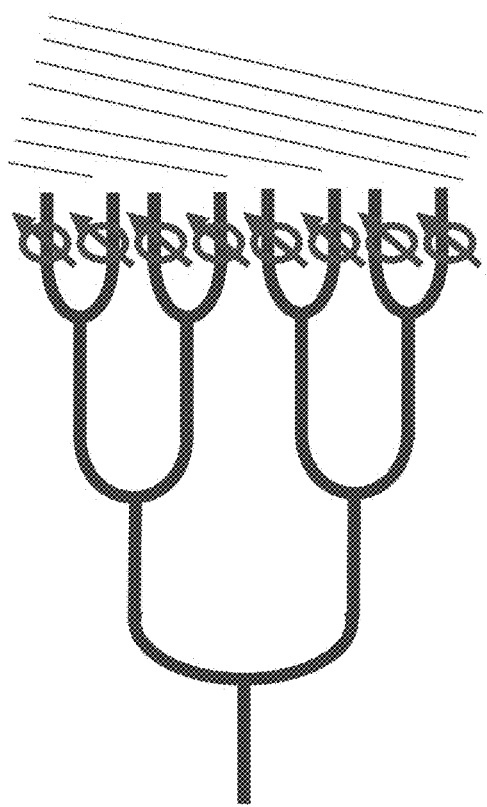
FIG. 6A illustrates beam steering with a conventional optical phased array using phase shifters.

The optical beam steering architecture shown in FIG. 1A has several advantages over phase-shifter based solutions. RF lenses were developed in part to reduce or minimize the use of phase shifters, which are expensive, lossy, complicated, power hungry and bulky. Some of the same considerations apply here: thermo-optic phase shifters are power hungry components, typically using 10 mW or more to achieve a π phase shift. To steer a beam with a one-thousand pixel device, it would be necessary to actuate on the order of 1000 phase shifters spread out in a 1 mm aperture as shown in FIG. 6A. This is because, in this architecture, power is uniformly fed to all output antenna elements through a 3 dB splitting tree and the thermal phase shifters are actively cohered to implement in-plane beam steering over 1000 resolvable points. Actuating this many phase shifters would dissipate about 10 Watts.

Now consider the system of FIG. 1A with thermo-optic phase shifters to operate the MZI switching matrix with N input ports to the planar dielectric lens. The lens-based approach achieves N resolvable points in-plane by switching with an MZI tree switching matrix between N ports of a dielectric lens feed. The power requirements for the MZI tree switching matrix in FIG. 6B scale like $\log_2 N$ as compared to N for the architecture in FIG. 6A because only MZIs associated with the desired optical signal path need to be activated (i.e., one MZI for each level of the switching matrix hierarchy); the rest can be "off" and draw no power. Consequently a lens-based device with 1000 resolvable points in plane dissipates 100 times less power for in-plane steering compared to the conventional phase-shifter based approach shown in FIG. 6A. Thus, for lens-enabled LIDAR, the power budget is dominated by the optical signal generation, whereas for the phase-shifter architectures, it scales primarily with the feed size.

Most practical phase-shifter approaches require active feedback to maintain beam coherence because thermal cross-talk causes changes in the path length of neighboring waveguides. This means either making a measurement of the relative phases on chip through lenses and detectors or measuring the beam in free space through an IR camera to provide feedback. But a lens-based device does not to actively cohere thousands of elements: it can use "binary"-like switching to route the light to the appropriate port, which is a simpler control problem. This means that the beams emitted by the input ports to the lens can have arbitrary relative phases. Lower power consumption additionally makes thermal fluctuations less severe.

Using a solid 1D grating reduces or eliminates grating lobes or high sidelobes that plague conventional optical phased arrays. This is at the cost of not being able to "constrain" the ray path to be in the forward direction and may result in having to use more material for the grating coupler, hence the triangle shape of the grating feed.

There is an alternate realization of this system, outlined below, which does not use TO phase shifters and parallelizes the in-plane ports. This architecture parallelizes one scanning direction, as is commonly used in most commercial LIDARs to increase scanning speed. This modification is not possible with the conventional phase-shifter based approach.

Another advantage of a lens-based architecture is the ability to use alternate material systems. One reason for using Si for phased-array designs is its large TO coefficient, which makes for lower power phase shifters. However, the maximum IR power a single Si waveguide can carry is 50 mW, which significantly limits the LIDAR range. SiN has much better properties in the IR and can take the order of 10 W through a single waveguide. However, noting that the power required to operate the phase shifter goes like $$\frac{dT}{dn}\sigma, \text{ where } \frac{dn}{dT}$$

is the thermo-optic coefficient and $\sigma$ is the conductivity, phase shifters on the SiN platform may use at least three times more power than their Si equivalents. This would exacerbate the power budget and control problems described above for any phase-shifter approach based on SiN. The lens-enabled design can still benefit from using SiN, and greatly improve the potential range, because the feed power is practically negligible.

No architecture is perfect, and there are several non-idealities which can alter the above story for our lens-based solution. The first is the nonuniform field of view of the device, which may cause problems for some applications. Another concern is scaling the number of resolvable points to thousands of pixels in each scanning direction. Although it is simple to ray-trace a lens which would support up to a thousand resolvable points for in-plane scanning, implementing such a lens in practice becomes more and more difficult because the required fabrication tolerances scale as 1/N. An additional concern is the impact of lens aberrations on the directivity degradation for the full aperture. Although it was captured by ray-tracing, it was not rigorously modeled to determine the required tolerances and behavior for high Q gratings.

LIDARs with Lens-Enable Optical Beamformers

Figure 7:
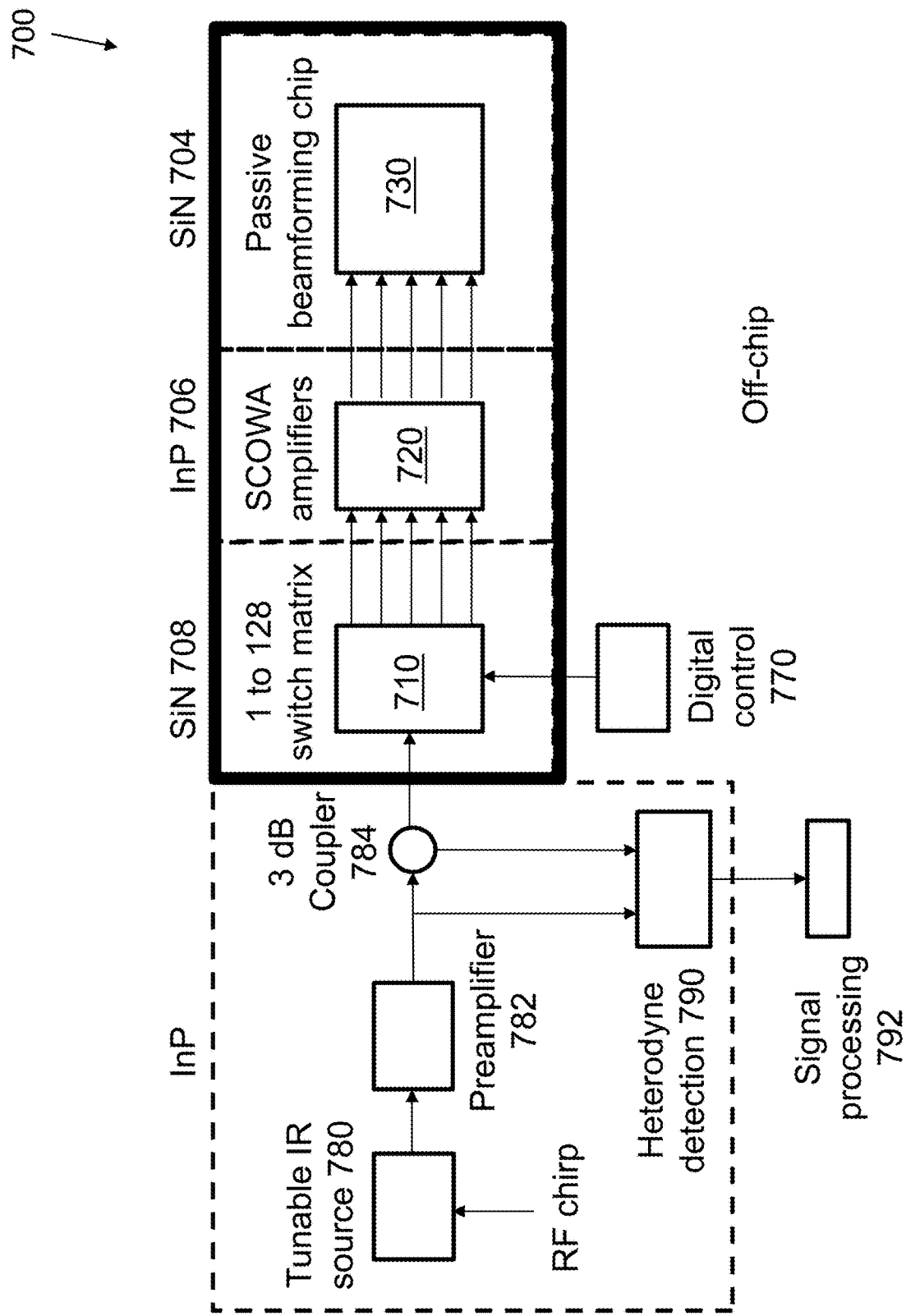
FIG. 7 is a block diagram of an integrated LIDAR chip with a planar dielectric lens for optical beam steering.

FIG. 7 shows a lidar system 700 that includes a lens-enabled, nonmechanical beam-forming system. The lidar system 100 includes a tunable IR light source 780 that emits a tunable IR beam. An optical preamplifier 782 optically coupled to the tunable IR light source 780 amplifies the tunable IR beam, which is coupled to a 1-to-128 MZI switch matrix 710 via a 3 dB coupler 784 or coupler. The 3 dB coupler picks off a portion of the amplified beam for heterodyne detection of the received beam with a detector 790. Signal processing electronics 792 coupled to the detector 790 process the received signal.

The switch matrix 710 is fabricated on a SiN platform 708 that is integrated with an InP platform 706 that supports a slab-coupled optical waveguide amplifier (SCOWA) array 712. This InP platrom is also integrated with another SiN platform 704 that includes a passive beamforming chip 720 with both a planar dielectric lens and an output coupler. The lens may be a 20 nm or 40 nm thick PolySi lenses, and output coupling gratings may be 10 nm, 20 nm, or 40 nm thick. The gratings support up to 300 resolvable points from wavelength tuning for the 10 nm variants over a 100 nm bandwidth. Because of fabrication constraints, the grating PolySi height may be the same as the lens height. This can result in tradeoffs because thicker gratings had lower quality factors, but thicker lenses have a better index contrast and can support more resolvable points. The switching matrix 710 is actuated by an off-chip digital controller 770.

In other examples, the system may be completely integrated. For instance, the tunable source, detectors, and electronics may be integrated on the chip as the switch matrix, lens, and output coupler. Bringing all of these technologies together compactly, cheaply, and robustly yields a new sensor capable of supporting the next generation of autonomous machines.

Figure 8:
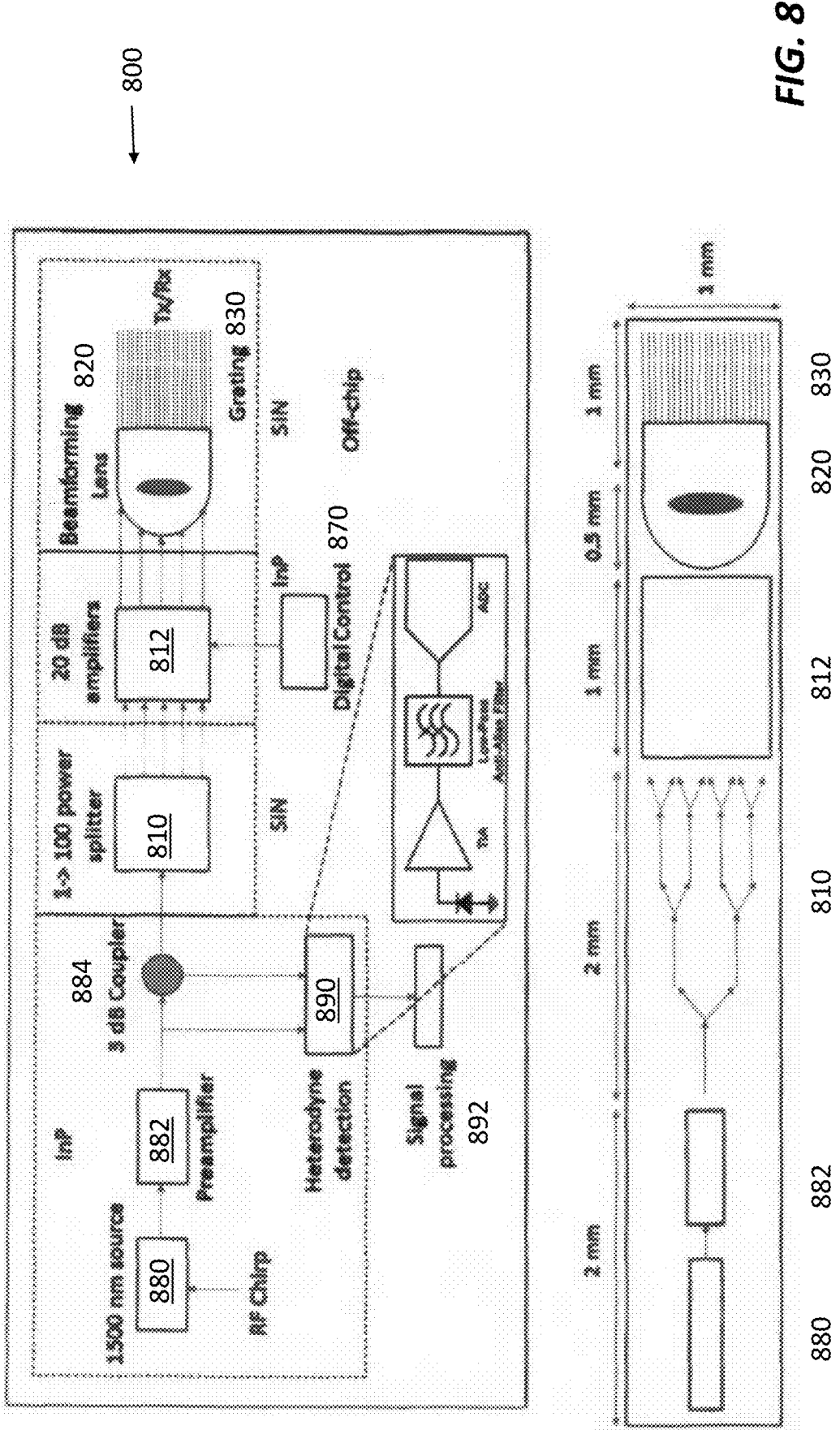
FIG. 8 shows a LIDAR with a tunable on-chip source that is modulated by a microwave chirp.

FIG. 8 shows a lidar 800 with a tunable on-chip source 880, which can be modulated with a microwave chirp. The chirped carrier travels through a preamplifier 882 and a directional coupler 884 and is split with a 1-to-100 passive power splitter 810 to feed an array of 100 20 dB amplifiers 812 on a 10 µm pitch. Waveguides from these amplifiers 812 are tapered to the edge of the beamforming aplanatic lens 820 implemented with a SiN slab. These amplifiers 812 are turned on and off with a digital controller 870 to the steer the output beam as explained below. The lens 820 ends on a flat surface in front of a 1 mm$^2$, 2D photonic crystal (PhC) 830 that serves as the aperture and grating coupler. The reflected return from a target comes back through the same aperture and is beat against a local oscillator (provided by the tunable source 880) and undergoes balanced detection with a heterodyne detector 890 coupled to signal processing electronics 892.

Figure 9:
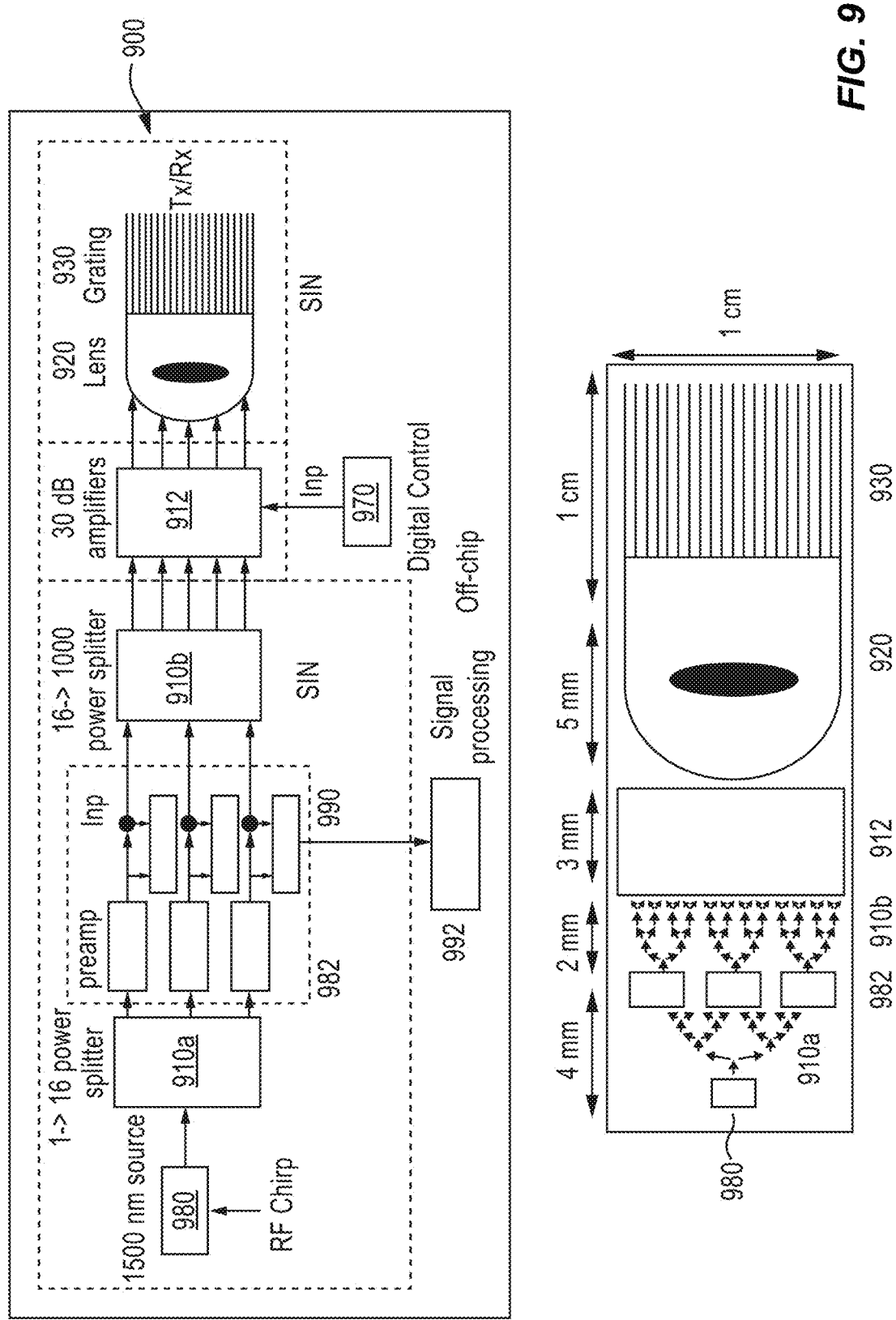
FIG. 9 shows an integrated optical beamforming system that scales the basic design of FIG. 8 to add functionality for N independently controllable beams.

FIG. 9 shows an integrated optical beamforming system 900 that scales the basic design to add functionality for N independently controllable beams. A seed from a tunable source 980 is split into 16 waveguides with a 1 by 16 power splitter 910a. Each of these 16 power splitter outputs feeds into its own preamplifier 982 and heterodyne detection unit 990, which are coupled to signal processing electronics 992. In turn, these feed 16 separate sections of the array with a power splitter 910b coupled to an array of 30 dB amplifiers 912 (here, 128 amplifiers) actuated by digital control electronics 970. A planar dielectric lens 920 collimates the outputs of the amplifier array 912 for diffraction by an output coupler 930, such as a 1D grating or 2D photonic crystal. Here, 128 independent beams with scanning ranges limited to 128 non-overlapping subsectors of the far field can be realized by turning on and off amplifiers connected to a given heterodyne detector.

Figures 10A, 10B:
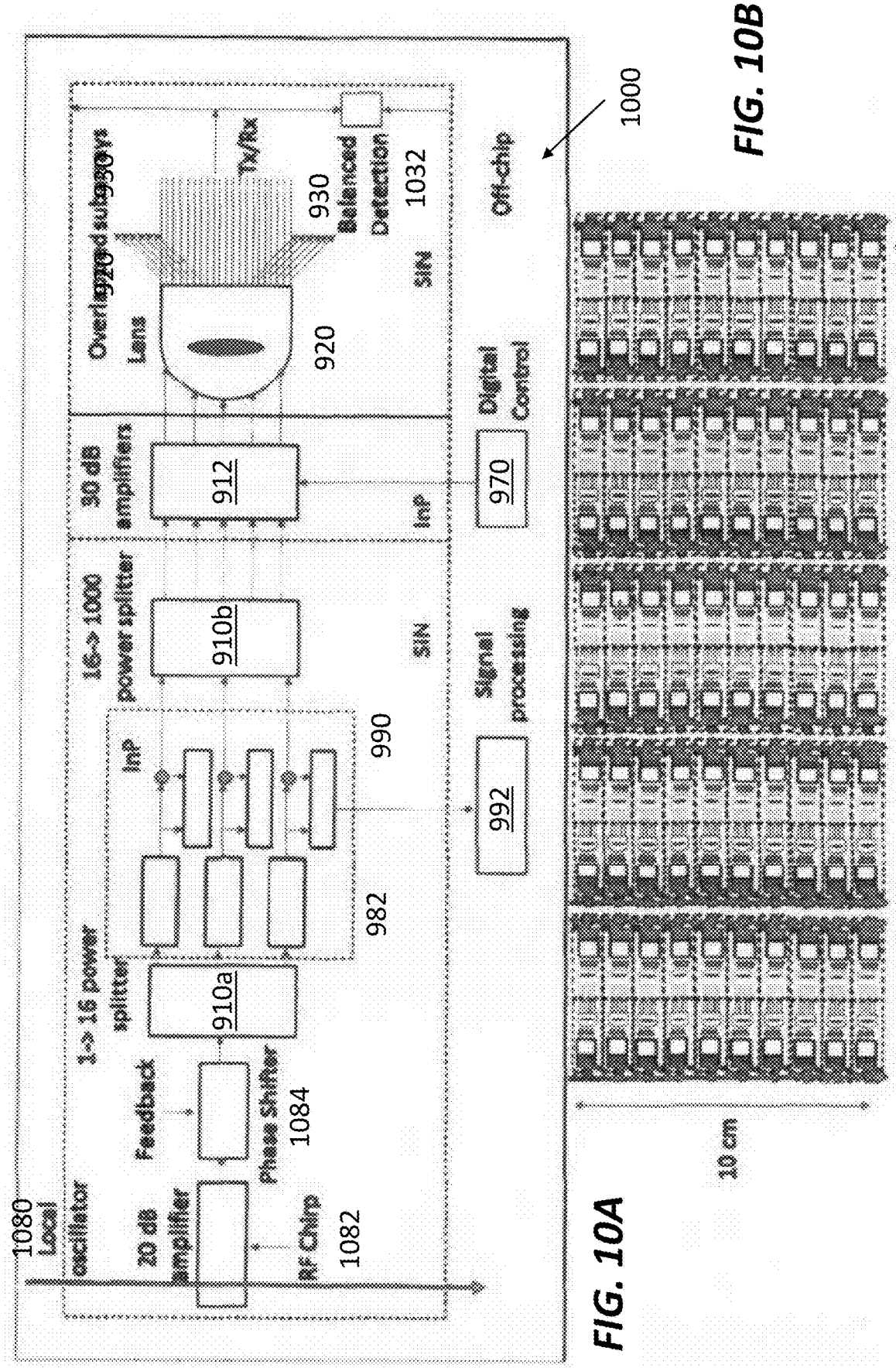
FIG. 10A shows how the unit cells shown in FIGS. 8 and 9 can be modified for tiling an M by N array.
FIG. 10B shows the tiling of the unit cells to form larger apertures.

The unit cells 800 and 900 shown in FIGS. 8 and 9 can be modified for tiling an M by N array as in FIG. 10A, which shows a unit cell 900 modified to receive a local oscillator 1080 distributed among the tiles with waveguides. This seed 1080 is amplified with a preamplifier 1082 and serves as the source for the tile. Before seeding the amplifiers 982, the source phase is changed with a thermal phase shifter 1084. After the output lens 920, the neighboring subarrays are overlapped to suppress the sidelobes of the tiled system. At the end of the grating 930, the output light is sampled and undergoes balanced detection using a balanced detector 1032 with the signal from a neighboring tile to provide feedback to cohere the tiles.

FIG. 10B shows the tiling of the unit cells to form larger apertures. The cells are flipped on one side to expand the effective length of the PhC gratings.

Tunable Light Source and Preamplifier

As explained in greater detail below, the wavelength of the light source controls the out-of plane angle of the optical beam. Typical grating antennas show steering at the rate of 0.1-0.2 degrees/nm. For instance, a light source with about 100 nm of tuning range provides a 12° to 16° field of regard. 2D photonic crystal gratings, discussed below, may have enhanced steering rates. In addition, the laser provides seed power for driving one or more optical amplifiers.

The power requirements for the laser source and optional preamplifier can be determined by working through the signal chain for the complete system. Consider a desired output of 500 mW/cm$^2$ for a system with 100 input ports to the lens. This corresponds to 5 mW from a 1 mm$^2$ aperture. If there are 6 dB losses in the grating and lens, the input to the lens should be about 20 mW. If the system includes an amplifier that provides 20 dB gain (for this input port), the input power to the channel should be 0.2 mW. To obtain 0.2 mW from a 1-to-128 splitter requires 20 mW ignoring losses. This translates to 80 mW from the light source and preamplifier, taking into account 6 dB losses from the splitter and coupler. Assuming a nominal 10% efficiency, this preamplifier would need 800 mW of electrical power for operation and 12 dB of gain given a 5 mW source.

These specifications for an on-chip source are reasonable. A recent work demonstrated a Vernier ring laser with 5.5 mW output power and a 41 nm tuning range. A thermal phase shifter allows tuning which can be adjusted on roughly 1 µs timescales, giving a sufficiently fast point-to-point sweep time for all realizations. This source may also be directly modulated with an RF chirp with a bandwidth of up to 9 GHz through plasma dispersion. RF modulation can also be implemented with an integrated single sideband modulator.

1-to-N Optical Splitter

The system 100 in FIG. 1A includes a 1-to-N optical matrix 110. In the embodiments shown in FIGS. 8, 9 and 10A, the switch matrix is replaced by one or two passive 1-to-N splitter trees coupled to an array of N semiconductor amplifier switches (discussed below). The splitter tree is created using a binary tree of 50:50 splitters fabricated in SiN. Each 50:50 splitter is an adiabatic 3 dB-coupler that is about 100-200 µm long and about 10 µm wide. Thus a 1-to-128 splitter tree has 7 levels of splitting and is about 1 mm by 1 mm. A 1-to-1024 splitter tree has 10 levels of splitting and is about 1.5 mm by 2 mm. Each splitter in the splitter tree has a very low excess loss of about 0.1 dB. Thus, the entire splitter tree has a total excess loss of about 1 dB is expected for the entire tree. Because the splitting tree is before the amplifier bank and each amplifier is either off or on and saturated, the system is not sensitive to minor variations in splitting ratio. This is in contrast to schemes in which splitters directly feed the grating coupler antennas. Adiabatic splitters are chosen to reduce or minimize back reflections and scattered light (which can be problematic in multimode interference (MMI) 3 dB splitters and Y-couplers) and to allow for uniform spitting over a wide optical bandwidth (>40 nm, which is not achieved using standard directional couplers).

For multiple beam and tiled realizations, a single laser source may feed into an array of preamplifiers. Consider a tiled realization with 16 tiles and a desired output of 500 mW from a 1 cm$^2$ aperture. If there are 16 simultaneous beams, the preamplifier array should provide a 125 mW output keeping the same losses as above. For preamplifier with a 30 dB gain, the input power should be at least 0.125 mW and the output show be at least 30 mW from one of the 20 dB preamplifier units before splitting. The electrical power consumption for the preamplifiers for multiple beam and tiled realizations will be 4.8 W for a single chip assuming 10% efficiency.

The source and preamplifier devices may be created in InP and picked and placed onto a passive SiN chip containing the splitters, lens, and grating. For the single tile realization, there may be one combined source, preamplifier, and detection InP chip. For other realizations, one chip may have an array of preamplifiers and detectors and another chip may have the source.

Semiconductor Optical Amplifier (SOA) Switches

A passive splitter tree can be coupled to an array of SOA switches as shown in FIGS. 8, 9, and 10A, with each SOA switch amplifying or attenuating the input signal as a function of externally applied power (control signal). SOAs have fast (~10 ns) switching speeds compared to thermal phase shifters (~1 µs). SOAs having small-signal gain of 20 dB (e.g., in the single-tile realization in FIG. 8) and 30 dB (FIGS. 9 and 10A) boost the seed laser output to provide the desired output power. For instance, the SOA output power may be 20 mW (FIG. 9), 125 mW (FIGS. 9 and 10A), or any other suitable power level. SOAs can be integrated with the SiN beamformer tiles using hybrid flip-chip integration. The SOAs may be of any suitable type, including conventional or low-confinement. Sample SOA specifications are shown in Table 1.

TABLE 1

Specifications for SOAs

| Realization | Gain (dB) | Psat (mW) | Efficiency | Length (cm) | Approach |
| --- | --- | --- | --- | --- | --- |
| Single Tile | 20 | 20 | 10% | <0.1 | Conventional SOA |
| ST, MB | 30 | 125 | 20% | 0.32 | High-confinement SCOWA |
| Arrayed Tiles | 30 | 125 | 30% | 0.32 | High-confinement SCOWA |

For example, each SOA may be implemented as the slab-coupled optical waveguide amplifier (SCOWA) developed by Lincoln Laboratory (LL). At 1550-nm wavelength, a 1 cm long InP-based SCOWA having small-signal gain of 30 dB and saturation output power of 400 mW has been demonstrated. By increasing the SCOWA confinement factor appropriately, a SOA having 30 dB gain and 125 mW output power should be realizable with a 0.32 cm length. In addition to providing enough gain and output power for this application, SCOWAs also have a very large transverse optical mode (e.g., about 5×5 μm), which increases the alignment tolerance when using flip-chip integration to couple SOA and SiN chips. The flip-chip coupling loss between a SCOWA and a SiP waveguide with the appropriate mode-size converter is about 0.5 dB to 1 dB.

For an array of conventional SOAs or SCOWAs, the minimum pitch is about 10 μm to avoid optical coupling between neighboring devices. This small pitch can be thermally managed as only one SCOWA is on at a time during operation. Therefore, arrays of 100 SCOWAs (single tile) and of 1000 SCOWAs (other realizations) have footprints of 0.1×0.1 cm and 1×0.32 cm. respectively.

Since these SOAs amplify to 20 mW for the single-tile realization in FIG. 8, the design uses 200 mW electrical operating power assuming 10% efficiency. Given that the on-chip source uses 800 mW, the total power requirements for a feasible realization can be limited to 1 W. This gives a dissipated power density of approximately 17 W/cm$^2$. For the single-tile realization with multiple beams shown in FIG. 9, given that 16 of the 125 mW amplifiers are on simultaneously and assuming 20% efficiency, the amplifier consumes 10 W. With 4.8 W for the preamplifier/source unit, the dissipated power density comes to 6 W/cm$^2$ for the single-tile with multiple beam realization of FIG. 9 and less than 8 W/cm$^2$ for the arrayed tile realization in FIG. 10A.

Given an operating power of 1 W, and an output power of 5 mW, a conservative estimate for the wall plug efficiency for the realization of FIG. 8 is about 0.5%.

For the realization of FIG. 9, the operating power may be about 15 W, including performance increases for the amplifier bank. With a 500 mW optical output power, this puts the wall-plug efficiency at 3%. Improving to a 30% efficient amplifier bank yields 5% wall-plug efficiency for the realization of FIG. 10A.

The preamplifier architecture employed in the realizations of FIGS. 9 and 10A makes it easier to increase the wall-plug efficiency. The benefit of using an array of preamplifiers mid-way through the splitting tree can be understood in the following way: it is most efficient to turn on and off individual sources at each input port of the beamforming lens. This means good solutions will reduce or minimize the power of the preamplifier stage, increase or maximize the gain of the final amplifier bank, and turn off any unused amplifiers. In this case, placing an array of preamplifiers after the 1-to-16 splitter 910a of FIGS. 9 and 10A reduces the power requirements for the preamplifier stage by a factor of 16. Consequently, whereas the preamplifier and source uses four times more power than the final amplifier array for the realization of FIG. 8, for the realizations of FIGS. 9 and 10A it uses four times less, assuming equal efficiency of the components.

To create a 1 mm aperture, a conventional optical phased array design needs on the order of 1000 thermal phase shifters. With an operating power of 20 mW/phase shifter, such a system would consume 20 W. This is an order of magnitude more power than the single-tile realization shown in FIG. 8. The favorable power scaling of the inventive approach extends to other beamforming architectures.

Planar Dielectric Lens

The original microwave literature going back to 1946 explored the use of lenses for beam-steering applications. That literature was chiefly concerned with mechanical displacement of the feed to obtain wide-angle and diffraction-limited beams. This specific approach was even implemented with MEMs and microlenses for small steering angles. Over time, many mathematical techniques were developed to numerically calculate the best lens shape to minimize aberrations which would otherwise quickly degrade the beam quality with increased steering angle. Specifically lenses with wide-angle steering of −40 to +40 degrees can be developed by numerically calculating a lens that satisfies a form of the Abbé sine condition.

Additional approaches to create lenses with similar wide angle ranges include bifocal and multi-focal lenses, which use additional degrees of freedom to create structures which have multiple perfect focal points in the imaging surface. The Rotman lens is one such lens which utilizes delay lines to create three focal points, one on-axis and two off-axis, for wide-angle steering. Graded index lenses such as the Luneburg lens allow for theoretically the widest angle steering possible by being spherically symmetric. Beyond developing such a rich variety of lenses, the microwave literature also explored many techniques for optimally feeding the lenses, minimizing reflections, shaping the feed end aperture field patterns, and dealing with a myriad of other technical problems which may be relevant to our effort.

The planar dielectric lens can be implemented using any one of a variety of designs. For example, it may be a dielectric slab lens with a single perfect focal point in the imaging surface and numerically designed to satisfy the Abbé sine condition. Fulfilling the Abbé sine condition gives near diffraction limited performance to up to ±40 degrees. For tiled realizations, alternate lenses, such as the Rotman lens or the Luneburg lens, may be employed to obtain up to 110 degrees or 180 degrees of in-plane beam steering, respectively.

There are several approaches for implementing the lens in integrated photonics, such as changing the height of the slab, patterning an additional layer, doping, and varying the density of subwavelength holes. These approaches have been used to implement GRIN lenses, such as the Luneburg lens, on chip. For one implementation, a thin layer of polysilicon can be patterned on a silicon nitride slab. The high index of polysilicon compared to silicon nitride creates a high effective index contrast thereby increasing the focusing power of the lens. Adiabatically tapering the height of the lens can reduce the radiation losses at the interface of the slab with the lens.

Coupler

To use the same antenna for transmit and receive, the antenna should capture backward-propagating return power. Off-chip, an optical circulator would direct the backward propagating signal to the receiver while providing good transmit/receive (T/R) isolation. However, the magneto-optical materials used in such reciprocity breaking devices are difficult to integrate on-chip. Instead, a simple adiabatic 3 dB splitter sends half the backward propagating power to the receiver. The low loss and large optical bandwidths of such splitters should limit the performance penalty to the 3 dB loss due to the splitting. This effect is especially small in the transmit direction as the splitter is located before the amplifier bank. Furthermore, since both the transmitter and receiver ports are located on the same side of the device, decent isolation of the receiver from the transmitter is provided. More sophisticated possibilities for transmitter-receiver isolation are also possible, including T/R switching or non-reciprocity from modulation.

Heterodyne Detection

The heterodyne detection shown in FIGS. 8, 9, and 10A can be performed with two balanced InP detectors. In operation, these detectors record the heterodyne beat signal between the chirped source and the chirped return. The use of balanced detectors allows for changes in the amplitude of the source and return to be decoupled from changes in the offset frequency, giving a more robust measurement of round-trip time.

The outputs of the balanced detectors provide in-phase and quadrature (I/Q) signals with an intermediate frequency (IF) bandwidth determined by the time-bandwidth product required from the transmitted linear-FM waveform. The outputs of the I/Q detectors can be processed to create LIDAR imaging products.

Consider the simple example of a LIDAR on an autonomous vehicle. This LIDAR uses a 1 GHz linearly frequency-modulated (LFM) chirp over a 10 µs period (1500 m range gate) in a repeating sawtooth waveform. Stretched-pulse processing reduces the speed and power consumption requirements for the IF analog-to-digital converter (ADC) in the signal processing electronics on each receive channel. At zero time lag between a target and the local oscillator (LO), the IF frequency is direct current (dc; 0 Hz). For a 0.2 µs (30 m) target-range displacement, the IF frequency is 20 MHz. An IF ADC with 50 Msamples/sec and a few bits of dynamic range can easily detect the displaced target and accurately determine its range with an uncertainty of ~15 cm (0.5*c/1 GHz). Such a compact circuit can be implemented in a 65 nm complementary metal-oxide-semiconductor (CMOS) process.

Overlapped Subarrays

Tiling creates a larger effective aperture as depicted in FIGS. 10A and 10B. Even if neighboring tiles are properly cohered, there may be many narrowly spaced sidelobes in the far-field because of the large distance between the center of each aperture. At the same time, this comb of far-field sidelobes may be modulated in magnitude by the far-field of the subarray pattern itself. Engineering the subarray pattern to resemble a sinc function in the near-field yields a box-like pattern in the far-field that suppresses the sidelobes. It is possible to scan N beamwidths within this box, where N is the number of subarray elements. For example, in a tiled implementation, exciting 1 of 1,000 ports for each tile and coherently phasing 10 neighboring tiles yields 10,000 resolvable points.

To produce a sinc pattern in the near-field, there are several approaches to overlap and delay parts of the beam. One strategy is to use multiple waveguide layers to route light from the output grating of one tile to another to form the larger subarray pattern. This arrangement can also work with a single layer of waveguides by utilizing low-cross talk direct waveguide crossings. Another approach uses an array of wedge-shaped microlenses or photonic crystals. One implementation includes super-collimating photonic crystals to keep the main part of the beam going straight and defect waveguides to delay and route light to neighboring tiles.

Analysis of Optical Beam Steering with a Planar Dielectric Lens

The following analysis is intended to elucidate operation of an optical beam steering device with a planar dielectric lens. It is not intended to limit the scope of the claims, nor is intended to wed such a device to particular mode or theory of operation.

Far-Field Angles

The aperture phase is determined by the initial ray directions, the grating parameters, and the wavelength. Since we are propagating through a straight grating, the plane wave k generated by the lens feed system will be conserved, so $k_{y,avg} = k_y \cdot k_x$ on the other hand, will be more complicated because it changes at each step of the grating. Assuming an initial in-plane angle of $\phi_{in}$, an index of the starting medium $n_1$, an index of the steps $n_2$ and a step duty cycle d, we find that $k_y$ and $k_{x,avg}$ are given by the following:

$$k_y = n_1 k_0 \sin(\phi_{in}) \qquad (7)$$

$$k_{x,avg} = d n_1 k_0 \cos(\phi_{in}) + (1-d) n_2 k_0 \sqrt{\left(1 - \frac{n_1^2}{n_2^2} \sin^2(\phi_{in})\right)}$$

The effective indices for the grating $n_1$ and $n_2$ are also functions of the wavelength. To compute the emission angle of this aperture, we perform phase matching between these wavevectors and those of a free-space plane wave with $\vec{k} = k_0 [\sin(\theta_O)\cos(\phi_O), \sin(\theta_O)\sin(\phi_O), \cos(\theta_O)]$.

$$k_0 \sin(\theta_O) \sin(\phi_O) = n_1 k_0 \sin(\phi_{in}) \qquad (8)$$

$$k_0 \sin(\theta_O) \cos(\phi_O) = k_{x,avg}(\phi_{in}) - \frac{2\pi m}{\Lambda}$$

Here we have subtracted a crystal momentum $2\pi m/\Lambda$, which originates from the discrete and periodic sampling implemented by the scattering from each grating step. We can rearrange this to derive the following expressions for the far-field angles:

$$\theta_O = \left( \frac{\sqrt{\left(k_{avg,x}(\phi_{in}) - \frac{2\pi m}{\Lambda}\right)^2 + (n_1 k_0 \sin(\phi_{in}))^2}}{k_0} \right) \qquad (9)$$

$$\phi_O = \left( \frac{n_1 k_0 \sin(\phi_{in})}{k_{avg,x}(\phi_{in}) - \frac{2\pi m}{\Lambda}} \right)$$

We want to understand how the far-field angles depend on the in-plane angle $\phi_{in}$ and the wavelength $\lambda$. We can identify that $\phi_O$ will be significantly greater than $\phi_{in}$. This results from the grating momentum $2\pi m/\Lambda$ being subtracted from $k_{avg,x}$ in the denominator. This means that relatively small variations in the input angle will greatly change the output in-plane angle $\phi_O$, sweeping it across the field-of-view. This feature ultimately allows us to use the lens in a small angle, aplanatic regime.

As we sweep $\phi_{in}$ we also expect variations in $\theta_O$. By examining (9), we see that the argument of the arcsine term seems to increase with $\phi_{in}$ and ultimately exceed 1, confining the beam in-plane. We can derive this cutoff condition (where $\theta_O=0$) more precisely by taking $k_{avg,x}(\phi_{in}) \approx n_{\it eff} k_0 \cos(\phi_{in})$, where $n_{\it eff} = d n_1 + (1-d) n_2$. Even though $n_{\it eff}$ is not truly constant, and its variations significantly effect the far-field angles, qualitatively this description holds. We find that the cutoff angle $\phi_{cut}$ satisfies:

$$1 = \left[ n_{\it eff} \cos(\phi_{cut}) - \frac{\lambda}{\Lambda} \right]^2 + n_1^2 [1 - \cos(\phi_{cut})^2] \qquad (10)$$

This can be easily rearranged into a quadratic equation and solved for $\phi_{cut}$. To get more intuition into the behavior of this angle, we examine the case of normal (or broadside) emission at $\phi_{in}=0$ and approximate $n_1 \approx n_{\it eff}$. Working this out we find:

$$\cos(\phi_{in}) \approx 1 - \frac{1}{2n_{eff}^2} \quad (11)$$

where $\tan(\phi_0) \approx -n_{eff}/2$ gives the corresponding $\phi_0$ at this point. It makes sense that the magnitude of the index will control the $\phi_{in}$ because it determines how rapidly $k_y$ increases as we move off axis. Overall, we can envision how $\vec{k}$ evolves as a function of $\phi_{in}$: starting from emission normal to the surface, as we adjust $\phi_{in}$ away from 0, $\vec{k}$ turns rapidly to one side and falls into the plane.

We can further visualize this trajectory by rearranging (8). Taking $u_{x,0}=\sin(\theta_0)\cos(\phi_0)$ and $u_{y,0}=\sin(\theta_0)\sin(\phi_0)$, we can manipulate (8) to find:

$$\left[\frac{u_{x,0} + \frac{m\lambda}{\Lambda}}{n_{eff}}\right]^2 + \left[\frac{u_{y,0}}{n_1}\right]^2 = 1 \quad (12)$$

This is an ellipse centered at $$\left[-\frac{m\lambda}{\Lambda}, 0\right].$$

As $\phi_{in}$ is varied, the emission direction will traverse an arc of this ellipse in $u_x, u_y$ space. Tuning the wavelength $\lambda$ will translate this ellipse forward and backward in the $u_x$ direction. The total field-of-view in $u_x, u_y$ space will have the form of a curved band whose thickness will be controlled by the total wavelength tuning range. We discuss the number of 3 dB overlapped beams we can fit inside this field-of-view below.

Far-Field Directivity

We can begin our derivation of the far-field pattern by noting that we can completely specify the near-field amplitude to have the following form:

$$A(x,y)=\exp(-qx)\exp(ik_0 u_{x0} x)\exp(ik_0 u_{y0} y) \quad (13)$$

where $u_{x0}=\sin(\theta_0)\cos(\phi_0)$ and $u_{y0}=\sin(\theta_0)\sin(\phi_0)$.

We have implicitly assumed a rectangular beam profile along the y-direction to simplify our calculations. In general we expect an additional function $f(y,x)$ to modulate the amplitude of the pattern according to the feed pattern, illumination position, and lens geometry. This derivation captures the most critical features of the far-field pattern and establishes an upper bound on the gain. In addition, the performance of the aperture is largely determined by its phase behavior, so smearing the amplitude distribution relative to the ideal tends to lead to small changes.

The physical aperture we are integrating over is a parallelogram bounded by the following conditions:

$$0 \leq x \leq L \quad (14)$$

$$-\frac{W}{2} + x\tan(\phi') \leq y \leq \frac{W}{2} + x\tan(\phi') \quad (15)$$

Here $\phi'$ is equal to $$\left(\frac{n_1 \sin(\phi_{in})k_0}{k_{x,avg}}\right) \approx \left(\frac{n_1 \sin(\phi_{in})}{n_{eff}\cos(\phi_{in})}\right)$$

and is close in magnitude to $\phi_{in}$ from the previous section, but not identical because of the refraction at the grating steps. To find the far-field pattern we can compute the Fourier transform of this amplitude pattern over the domain:

$$F(u_x - u_{x0}, u_y - u_{y0}) = \int_0^L dx \quad (16)$$

$$\int_{-\frac{W}{2}+x\tan\phi'}^{\frac{W}{2}+x\tan\phi'} dy \exp(-qx)\exp(-ik_0(u_x - u_{x0})x)\exp(-ik_0(u_y - u_{y0})y)$$

Where $u_x=\sin(\theta)\cos(\phi)$ and $u_y=\sin(\theta)\sin(\phi)$, which are the direction angles. For convenience, from here we denote $u_x - u_{x0}$ with $\Delta u_x$ and $u_y - u_{y0}$ with $\Delta u_y$. We can evaluate these integrals easily to find:

$$F(\Delta u_x, \Delta u_y) = \quad (17)$$

$$\frac{\sin\left(k_0 \frac{W}{2} \Delta u_y\right)}{k_0 \Delta u_y} \frac{1 - \exp(-qL)\exp(ik_0 L(u_x + \tan(\phi')\Delta u_y))}{q + ik_0(u_x + \tan(\phi')\Delta u_y)} A$$

The power of the far-field pattern is the magnitude of the field pattern squared, that is $P=|F|^2$. We use the power P below to compute the directivity of the far-field pattern with the following expression:

$$D(\theta, \phi) = \frac{P(\theta, \phi)}{\frac{1}{2\pi}\int_0^\pi d\theta \sin\theta \int_0^{2\pi} d\phi P(\theta, \phi)} \quad (18)$$

The directivity gives the factor of the power emitted in a given direction relative to an isotropic radiator. A well-designed directional antenna tends to increase or maximize the peak gain, the directivity of the main lobe, and reduce or minimize the power into sidelobes, because these waste power and contribute to false detections. We will discuss the directivity more below concerning the range of the system and the number of resolvable points.

We can create a simpler expression by expanding the direction angles about the far-field peak at $\theta=\theta_0$ and $\phi=\phi_0$, we can also take the limits of the integral to infinity. This creates negligible error in the case of high-gain beams and ultimately allows many of these gain integrals to be evaluated analytically:

$$D(\Delta\theta, \Delta\phi) \approx \frac{P(\Delta\theta, \Delta\phi)}{\frac{\sin\theta_0}{2\pi}\int_{-\infty}^\infty d\Delta\theta \int_{-\infty}^\infty d\Delta\phi P(\Delta\theta, \Delta\phi)} \quad (19)$$

It's illustrative to change coordinates of this expression from $\theta$ and $\phi$ to $\Delta u_x$ and $\Delta u_y$. We can find:

$$\Delta u_x = \cos(\theta_0)\sin(\phi_0)\Delta\theta + \sin(\theta_0)\cos(\phi_0)\Delta\phi = u_x - u_{x,0} \quad (20)$$

$$\Delta u_y = \cos(\theta_0)\cos(\phi_0)\Delta\theta - \sin(\theta_0)\sin(\phi_0)\Delta\phi = u_y - u_{y,0} \quad (21)$$

where we have taken $\phi=\phi_0+\Delta\phi$ and $\theta=\theta_0+\Delta\theta$. We can use these expressions to calculate the following Jacobian, where we have changed variables from $\phi$ and $\theta$ to $\Delta\phi$ and $\Delta\theta$:

$$d\Delta\theta d\Delta\phi \sin(\theta_0) = d\Delta u_x d\Delta u_y \sin(\theta_0) \begin{vmatrix} \frac{\sin(\phi_0)}{\cos(\theta_0)} & \frac{\cos(\phi_0)}{\cos(\theta_0)} \\ \frac{\cos(\phi_0)}{\sin(\theta_0)} & -\frac{\sin(\phi_0)}{\sin(\theta_0)} \end{vmatrix} \quad (22)$$

$$= \frac{d\Delta u_x d\Delta u_y}{\cos(\theta_0)}$$

Taken together, we can use these results to rewrite our expression for the peak gain as a function of $\Delta u_x$ and $\Delta u_y$:

$$D(\Delta u_x, \Delta u_y) = \frac{2\pi\cos(\theta_0) P(\Delta u_x, \Delta u_y)}{\int_{-\infty}^{\infty} d\Delta u_x \int_{-\infty}^{\infty} d\Delta u_y P(\Delta u_x, \Delta u_y)} \quad (23)$$

This unsimplified expression can already tell us something very useful—that the peak gain of a given pattern is directly proportional to $\cos(\theta_0)$. This result emerges because the far-field gain in general is proportional to the projected area. To first order, neglecting additional aberrations and changes in the grating parameters, effective indices, reflections, and feed illumination, the peak gain fall-off as a function of angle is just determined by the angle between the emission vector and the z-axis. Another feature of this equation is that the peak shape is essentially independent of the center of the main lobe: to leading order the pattern just changes by the $\cos(\theta_0)$ scale factor.

We can directly evaluate these integrals for our far-field pattern:

$$\int_{-\infty}^{\infty} d\Delta u_x \int_{-\infty}^{\infty} d\Delta u_y P(\Delta u_x, \Delta u_y) = \quad (24)$$

$$\int_{-\infty}^{\infty} d\Delta u_x \int_{-\infty}^{\infty} d\Delta u_y \frac{\sinc^2\left(\frac{W}{2} k_0 \Delta u_y\right)}{1 + \frac{k_0^2}{q^2}(\Delta u_x + \tan(\phi)\Delta u_y)^2} \times$$

$$(1 - 2\cos(k_0 L(\Delta u_x + \tan(\phi)\Delta u_y))\exp(-qL) + \exp(-2qL))$$

We first start by performing a shear transformation on the integrating variables given by: $\Delta u_{x,s} = \Delta u_x + \tan(\phi)\Delta u_y$, and $\Delta u_{y,s} = \Delta u_y$. With this transformation the integral now becomes separable:

$$\int_{-\infty}^{\infty} d\Delta u_x \int_{-\infty}^{\infty} d\Delta u_x P(\Delta u_x, \Delta u_y) = \quad (25)$$

$$\int_{-\infty}^{\infty} d\Delta u_{x,s} \frac{(1 - 2\cos(k_0 L \Delta u_{x,s})\exp(-qL) + \exp(-2qL))}{1 + \frac{k_0^2}{q^2}\Delta u_{x,s}^2}$$

$$\int_{-\infty}^{\infty} d\Delta u_{y,s} \sinc^2\left(\frac{W}{2} k_0 \Delta u_{y,s}\right)$$

Note that the angle $\theta_p$ does not change the projected area of the aperture, since it just shears the emitting surface. Consequently we expect it to completely drop out of the integral, which is indeed the case. Next we remove the dimensions and break the integrals into parts and evaluate:

$$\frac{2q}{Wk_0^2} \int_{-\infty}^{\infty} dx \left( \frac{(1 + \exp(-2qL))}{1 + x^2} - \frac{2\cos(qLx)\exp(-qL)}{1 + x^2} \right) \int_{\infty}^{\infty} dy(^2(y)) = \quad (26)$$

-continued $$\frac{2q\pi^2}{Wk_0^2}((1 + \exp(-2qL)) - 2\exp(-2qL))$$

Using these results, finally we can write the directivity as:

$$D(\Delta u_x, \Delta u_y) = \frac{Wk_0^2 \cos(\theta_0)}{\pi q(1 - \exp(-2qL))} \frac{\sinc^2\left(\frac{W}{2} k_0 \Delta u_y\right)}{1 + \frac{k_0^2}{q^2}(\Delta u_x + \tan(\phi')\Delta u_y)^2} \times \quad (27)$$

$$(1 - 2\cos(k_0 L(\Delta u_x + \tan(\phi')\Delta u_y))\exp(-qL) + \exp(-2qL))$$

We can also expression the peak directivity as:

$$D_{max} = \cos(\theta_0) \frac{Wk_0^2}{\pi q} \frac{1}{1 + \frac{k_0^2}{q^2}} \frac{(1 - \exp(-qL))^2}{(1 - \exp(-2qL))} \quad (28)$$

To gain a little insight into how this function behaves, we can simplify it for large and small L. For $L \ll 1/q$, we find:

$$\lim_{qL \to 0} D(\Delta u_x, \Delta u_y) = \quad (29)$$

$$\frac{WLk_0^2 \cos(\theta_0)}{2\pi} \sinc^2\left(\frac{W}{2} k_0 \Delta u_y\right) \sinc^2\left(\frac{L}{2} k_0(\Delta u_x + \tan(\phi')\Delta u_y)\right)$$

This is just the directivity from a sheared rectangular aperture of length L and width W, note that the peak gain is $$\frac{WLk_0^2 \cos(\theta_0)}{2\pi},$$

which is directly proportional to the projected area $WL\cos(\theta_0)$. Taking the opposite limit, we can find another useful simplification:

$$\lim_{qL \to \infty} D(\Delta u_x, \Delta u_y) = \frac{Wk_0^2 \cos(\theta_0)}{\pi q} \frac{\sinc^2\left(\frac{W}{2} k_0 \Delta u_y\right)}{1 + \frac{k_0^2}{q^2}(\Delta u_x + \tan(\phi')\Delta u_y)^2} \quad (30)$$

Here the peak directivity scales as $$\frac{W}{q} \cos(\theta_0), \text{ where } \frac{1}{q}$$

becomes the effective length of the aperture. Even though these expressions are much simpler than the general one we derived, even if the aperture is several decay lengths long, the effect of the finite length of the directivity is significant and properly modeling it requires the full expression. An example of this is in computing the number of far-field resolvable points.

Number of Resolvable Points with Wavelength Tuning
Another property of our system is the number of far-field resolvable points. There are some relatively simple expressions we can derive which will tightly bound the number of resolvable points we can achieve in a particular system as a function of the aperture parameters. We will first start with the number of resolvable points we can achieve through wavelength tuning. Assuming normal incidence from the feed, the far-field condition for the unit vector in the x-direction is just:

$$n_{eff} k_0 - \frac{2\pi}{\Lambda} m = k_0 u_x,$$

where $u_x$ is the unit vector of the wavevector in the x-direction, $n_{eff}$ is the effective index of the grating at normal incidence, $\Lambda$ is the grating period, and m is the grating order.

We want to count the number of full-width half-maximums $\Delta u_{FWHM}$, we can fit inside a total tuning range of $\Delta u_{range}$. $\Delta u_{range}$ in this case is just given by $$\frac{m \Delta \lambda}{\Lambda},$$

where $\Delta \lambda$ is the tuning wavelength, and is typically 50-100 nm for integrated tunable sources. With this we can write a simple expression for the number of resolvable points with wavelength tuning $N_{wavelength}$:

$$N_{wavelength} \approx \frac{m \Delta \lambda}{\Lambda_0 \Delta u_{FWHM}} + 1 \quad (31)$$

In the case of a finite length grating, $\Delta u_{FWHM}$ is computed numerically from the full directivity formula to give a precise calculation of the number of resolvable points. However, in the case of a long grating, we can determine exactly that $$\Delta u_{FWHM} = \frac{2q}{k_0}.$$

Plugging this in gives the following relationship:

$$N_{wavelength} \approx \pi \frac{\Delta \lambda}{\lambda_0} \frac{m}{q \Lambda_0} + 1 \quad (32)$$

Assuming that at $\lambda_0$, that the grating is emitting at normal incidence, and using our expression relating the decay length q to the grating quality factor Q, we find that:

$$N_{wavelength} \approx Q n_{eff} \frac{\Delta \lambda}{\lambda_0} \frac{v_g}{c} + 1 \quad (33)$$

Number of Resolvable Points from in-Plane Steering

We assume that we can determine the number of resolvable points from the field pattern at the lens aperture, as opposed to the pattern after being emitted from the grating. In 1D, the directivity of a far-field pattern $A(\theta)$ is defined by $$\frac{A}{\frac{1}{\pi} \int A(\theta) d\theta}.$$

Assuming that the power is confined to a single lobe of angular width $\Delta \theta$, we can approximate $D_{peak}$ as $\pi / \Delta \theta$. Neglecting lens aberrations, the directivity can be written:

$$D(\theta) = \frac{\pi}{\Delta \theta} \cos(\theta) \quad (34)$$

The steering range in this situation is limited by the minimum acceptable gain usable by the system. Typically RADARs are designed to have a directivity fall-off of 3 dB or 0.5 at the edge of their usable FOV. This gives an effective steering range of $2\pi/3$ radians. Conveniently approximating the beam-width to be constant, we find that:

$$N_{in\text{-}plane} \approx \frac{2 D_{peak}}{3} = \frac{2\pi W}{3\lambda} \quad (35)$$

where we have substituted in the peak directivity of a rectangular aperture of size W. This equation accurately reflects the scaling of the number of resolvable points $a/\lambda$ when is between 10 and 40 or so. Beyond this, the path error for off-axis scanning angles begins to become an appreciable fraction of the wavelength (since the error is directly proportional to the lens size). The 3 dB scanning limit will be squeezed inwards as $a/\lambda$ increases.

Abbé Sine Condition

If desired, we can shape a lens to satisfy the Abbé sine condition. Satisfying the Abbé sine condition eliminates Coma aberration on-axis and reduces it off axis in the regime where $\sin(\phi) = \phi$. We briefly outline the procedure for generating a shaped lens given input parameters thickness T, focal length F, effective focal length $F_e$, and index n. The inner surface of the lens is defined by r, $\theta$, while the outer surface is defined by x, y. In this coordinate system, we satisfy the Abbé sine condition when $y = F_e \sin(\theta)$. We can further relate r and $\theta$ to x and y from the following expression calculated from ray-propagation:

$$r + n\sqrt{(y - r\sin(\theta))^2 + (-r\cos(\theta))^2} - x = (n-1)T \quad (36)$$

This can be written as a quadratic equation for x and solved. Once x is solved, r can be advanced by computing:

$$\frac{dr}{d\theta} = \frac{nr \sin(\theta - \theta')}{n \cos(\theta - \theta') - 1} \quad (37)$$

Where:

$$\theta' = \tan^{-1} \left[ \frac{(F_e - r)\sin(\theta)}{x - r\cos(\theta)} \right] \quad (38)$$

These equations can be solved iteratively to generate the entire lens surface, beginning with $\theta = 0$ and $r = F$. Other methods can be used to generate shaped lens surfaces, such as designing the aperture power pattern based on the feed power pattern or forcing the lens to have two off-axis focal points.

LIDAR Range

Generally, the minimum detectable received power $P_{r,min}$ from a LIDAR return determines the maximum range of the device. $P_{r,min}$ is determined by the integration time and sensor architecture, which can be based on frequency modulated continuous wave (FMCW) or pulsed direct detection type schemes. If a target has a cross section σ, the maximum range we can observe that target is given by the standard RADAR equation:

$$P_{r,min} = \frac{D(\theta, \phi)^2 \eta^2}{(4\pi)^3} \frac{\lambda^2}{R_{max}^4} \sigma P_t \tag{39}$$

where $D(\theta,\phi)$ is the directivity, θ is the device efficiency, $R_{max}$ is the maximum range, and $P_t$ is the transmitter power. We see here that the primary determinant of the LIDAR performance beyond the detection backend are the antenna characteristics given by $D(\theta,\phi)$ and η.

In the case that the beam spot from the LIDAR is contained completely within the target, which is a common application mode for LIDARs, we can derive an alternate constraint, which is more forgiving than the standard RADAR range equation in terms of distance falloff:

$$P_{r,min} = \frac{D(\theta, \phi)\eta}{(4\pi)^2} \frac{\lambda^2}{R_{max}^2} P_t \tag{40}$$

Overview of Numerical Methods and Verification

Because of structures are large and lack periodicity, full 3D FDTD simulations were not possible. However, we were able to do smaller 2D and 3D FDTD simulations of individual components to help verify the system performance.

First, we conducted simulations of the waveguides generated from the routing algorithms to verify that they were defined with enough points, were not too close, and satisfied minimum bend radius requirements. Unfortunately, having 3 dB spaced far-field spots results in wavelength-spaced ports in the focal surface. Although the waveguides can be wavelength-spaced for short lengths without significant coupling, generally the feed geometry results in excessively high coupling between waveguides. We fixed this problem by decimating the ports by a factor of two.

Figure 11:
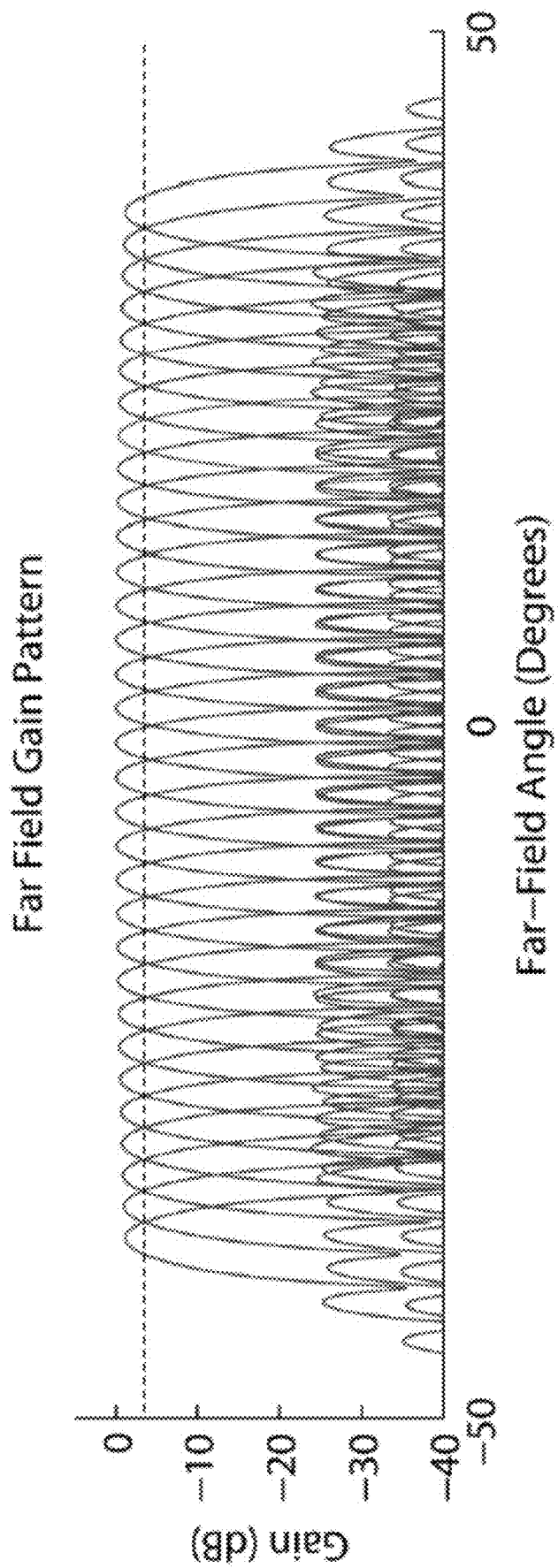
FIG. 11 shows 3 dB overlapped far-field beam patterns for a lens-enabled beam-forming system.

FIG. 11 shows 32 simulated 3 dB overlapped far-field beam patterns. Each main peak represents a single port excitation. Peaks to each side of main peak are sidelobes. These represent power radiated in unintended directions and may result in false detections. The dotted line indicates −3 dB. Port positions are designed to overlap far-field resolvable spots by 3 dB. For a 2D aperture, this is done along parameterized curve between each spot in $u_x, u_y$ space.

FIGS. 12A-12D show simulations for design of chip-scale LIDAR. FIG. 12A shows a simulation of a far-field beam pattern to extract phase center. FIG. 12B shows a simulation of a far-field beam pattern to extract gaussian beamwidth. FIG. 12C shows a 2D simulation of on-axis port excitation of a lens feed. FIG. 12D shows a 2D simulation of off-axis port excitation of the lens feed.

The simulations of FIGS. 12A and 12B involve the interface between the waveguide and the SiN slab. With these simulations, we visualized the creation of an effective point dipole source when the waveguide terminated at the slab, and determined the far-field radiation pattern and effective phase center. By fitting circles to the phase front, we were able to extract a location for the phase center, which we show in FIG. 12A. The phase front was approximately 1 μm behind the interface between the waveguide slab and the waveguide. The far-field power as a function of angle was well described by a Gaussian with a beam-width of 13.5°, as shown in FIG. 12B. The phase center and beam-width did not change if the waveguide was incident at an angle on the interface: the phase center and beam-profile remained the same relative to the orientation of the waveguide. This feature was useful because it allowed us to angle the waveguides to reduce or minimize the spillover loss (the radiation that misses the lens) without having to be concerned about the beam-width or phase center changing.

Another set of simulations we performed concerned the interface of the lens and the slab. One assumption, which is also a feature of other works on integrated planar lenses, is that we can describe the in-plane propagation in terms of the effective mode indices. We did several calculations of TE slab modes impacting 20 nm and 40 nm Si slab "steps" to verify this assertion and to quantify the radiation loss at these interfaces. We found that for a wide range of angles, the radiation loss was less than 5% in line with previous experimental results for incident angles less than 40°.

We also performed effective 2D FDTD simulations of the waveguides, the lens feed, and the lens itself to verify that beam-steering worked properly. We see this in FIGS. 12C and 12D. We confirmed the directivity derived from these simulations closely matched those produced by ray-tracing. We also verified that the expected lens roughness for fabrication would not result in excessive gain degradation. 2D grating simulations of a 1D grating were used to extract the grating Q as a function of wavelength. The emission angle was compared to that predicted from the average grating index and good agreement was obtained. Additionally we modeled the photonic bandstructure using meep to confirm that our excitation was far from the Bragg band edge.

Finally, we extracted the grating Q as a function of angle and wavelength from meep calculations. We confirmed the on-axis performance matched that predicted from the FDTD simulations. Additionally we confirmed that the Q did not change too much for off-axis propagation. Generally the behavior within ±20° was well-behaved, but beyond that there were large fluctuations. For the ray-tracing simulations, in the regime of interest, the grating Q could be considered constant, but in general it was a complicated, rapidly varying function. Rigorously modeling Q as a function of angle accounts for the unexpectedly strong dependence in certain regimes.

Index Error

The effective index ratio $n_2/n_1$ of an experimental system is different than that used in ray-tracing simulations, because of finite fabrication tolerance, wavelength dispersion, temperature variation, etc. In general, an error in the index may cause the focal plane to shift by some amount. For a parabolic lens, we find that the change is:

$$\Delta f = \frac{f^2}{R} \Delta n \tag{41}$$

Since the depth of focus scales as λ, R:ƒ, and ƒ:λN, where N is the number of resolvable points, we have that our effective index tolerance scales inversely with the number of resolvable points that the imaging system supports:

$$\Delta n \approx \frac{1}{N} \tag{42}$$

Without any kind of external tunablity, meeting this constraint for large N becomes increasingly difficult. For more than 100 ports, wavelength dispersion over a 100 nm bandwidth already exceeds this constraint for a 40 nm thick lens. For proper operation of a device with 100 ports at a single wavelength, there should be better than ±1 nm of precision in the layer heights, and better than 0.01 tolerance in the material index. Addressing these index tolerance issues enables scaling the system to 1000s of resolvable points.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical beam steering apparatus comprising:
a substrate;
a plurality of waveguides formed on the substrate;
a Luneburg lens, formed on the substrate in optical communication with the plurality of waveguides, to direct light emitted by the plurality of waveguides in different directions; and
an output coupler, formed on the substrate in optical communication with the Luneburg lens, to couple at least a portion of the light out of a plane of the Luneburg lens.

2. The optical beam steering apparatus of claim 1, wherein the Luneburg lens has a field of view of about 180 degrees.

3. The optical beam steering apparatus of claim 1, wherein the Luneburg lens is a planar lens having a graded index profile.

4. The optical beam steering apparatus of claim 1, wherein the Luneburg lens comprises a layer of polysilicon patterned on silicon nitride.

5. The optical beam steering apparatus of claim 1, wherein the output coupler is configured to resolve at least 100 wavelengths.

6. The optical beam steering apparatus of claim 1, further comprising:
a tunable light source, in optical communication with the plurality of waveguides, to tune the wavelength of the light.

7. The optical beam steering apparatus of claim 6, further comprising:
a network of optical switches, formed on the substrate in optical communication with the tunable light source and the plurality of waveguides, to guide the light from the tunable light source to a first waveguide in the plurality of waveguides when in a first state and to guide the light emitted by the second waveguide in the plurality of waveguides when in a second state.

8. The optical beam steering apparatus of claim 7, wherein the plurality of waveguides comprises N waveguides and wherein up to $\log_2 N$ optical switches in the network of optical switches are actuated to switch from the first state to the second state.

9. The optical beam steering apparatus of claim 7, further comprising:
a plurality of optical amplifiers, formed on the substrate in optical communication with the network of optical switches and the plurality of waveguides, to amplify the light emitted by the first waveguide and the light emitted by the second waveguide.

10. A method of optical beam steering with a plurality of waveguides, a Luneburg lens, and an output coupler integrated with a substrate, the method comprising:
guiding light with the plurality of waveguides to the Luneburg lens;
directing the light from the plurality of waveguides to the output coupler with the Luneburg lens; and
coupling at least a portion of the light out of the plane of the Luneburg lens with the output coupler.

11. The method of claim 10, further comprising:
tuning a wavelength of the light so as to change an angle between the light and the plane of the Luneburg lens.

12. The method of claim 10, further comprising:
guiding the light to the plurality of waveguides with a network of optical switches formed on the substrate.

13. The method of claim 12, wherein the plurality of waveguides comprises N waveguides and further comprising:
actuating up to $\log_2 N$ optical switches in the network of optical switches to switch the light between waveguides in the plurality of waveguides.

14. The method of claim 10, further comprising:
amplifying the light with an optical amplifier formed on the substrate in optical communication with the plurality of waveguides.

15. The method of claim 10, further comprising:
receiving light via the output coupler;
guiding the light via the output coupler to the Luneburg lens; and
coupling the light into a waveguide in the plurality of waveguides with the Luneburg lens.

16. A lidar comprising:
a tunable light source to emit a beam of light;
a plurality of waveguides;
at least one optical switch, in optical communication with the tunable light source and the plurality of waveguides, to guide the beam of light to a waveguide in the plurality of waveguides;
a Luneburg lens, in optical communication with the plurality of waveguides, to collimate the beam of light emitted by the waveguide as a collimated beam propagating in a plane of the Luneburg lens; and
a periodic structure, in optical communication with the Luneburg lens, to diffract at least a portion of the collimated beam at an angle with respect to the plane of the Luneburg lens.

17. The lidar of claim 16, wherein the tunable light source is tunable over a bandwidth of at least 100 nm.

18. The lidar of claim 16, wherein the Luneburg lens has a field of view of about 180 degrees.

19. The lidar of claim 16, wherein the Luneburg lens is patterned in a slab waveguide coupled to the plurality of waveguides.

20. The lidar of claim 16, wherein the Luneburg lens is a planar lens having a graded index profile.

21. The optical beam steering apparatus of claim 1, wherein the output coupler comprises a curved grating.

22. The optical beam steering apparatus of claim 1, further comprising:
a slab waveguide, formed on the substrate in optical communication with the plurality of waveguides and the Luneburg lens, to guide the light from the plurality of waveguides to the Luneburg lens.

23. A method of optical beam steering with a planar Luneburg lens formed in a substrate in optical communication with a waveguide array and a curved grating, the waveguide array comprising a first waveguide and a second waveguide, the method comprising:
collimating, with the planar Luneburg, light emitted by the first waveguide as a first collimated beam propagating in a first direction in a plane of the substrate;
collimating, with the planar Luneburg, light emitted by the second waveguide as a second collimated beam propagating in a second direction in the plane of the substrate different than the first direction; and
coupling, with the curved grating, at least a portion of the first collimated beam and the second collimated beam out of the plane of the substrate.

24. The method of claim 23, wherein collimating the light emitted by the first waveguide and collimating the light emitted by the second waveguide occur simultaneously.

25. The method of claim 23, further comprising:
tuning a wavelength of the light emitted by the first waveguide and the light emitted by the second waveguide.

26. The method of claim 23, further comprising:
coupling the light into the first waveguide via an optical switch in a first state;
actuating the optical switch from the first state to a second state; and
coupling the light into the second waveguide via the optical switch in the second state.

* * * * *